(12) United States Patent
Resch et al.

(10) Patent No.: US 8,479,078 B2
(45) Date of Patent: Jul. 2, 2013

(54) DISTRIBUTED STORAGE NETWORK FOR MODIFICATION OF A DATA OBJECT

(75) Inventors: Jason K. Resch, Chicago, IL (US); Bart Cilfone, Chicago, IL (US)

(73) Assignee: Cleversafe, Inc., Chicago, IL (US)

( * ) Notice: Subject to any disclaimer, the term of this patent is extended or adjusted under 35 U.S.C. 154(b) by 420 days.

(21) Appl. No.: 12/839,197

(22) Filed: Jul. 19, 2010

(65) Prior Publication Data

US 2011/0107165 A1 May 5, 2011

Related U.S. Application Data

(60) Provisional application No. 61/256,436, filed on Oct. 30, 2009.

(51) Int. Cl.
*G06F 11/00* (2006.01)
*G11C 29/00* (2006.01)

(52) U.S. Cl.
USPC ............ 714/763; 714/6.1; 714/6.2; 714/6.24; 714/54

(58) Field of Classification Search
None
See application file for complete search history.

(56) References Cited

U.S. PATENT DOCUMENTS

| | | | |
|---|---|---|---|
| 4,092,732 A | 5/1978 | Ouchi | |
| 5,454,101 A | 9/1995 | Mackay et al. | |
| 5,485,474 A | 1/1996 | Rabin | |
| 5,774,643 A | 6/1998 | Lubbers et al. | |
| 5,802,364 A | 9/1998 | Senator et al. | |
| 5,809,285 A | 9/1998 | Hilland | |
| 5,890,156 A | 3/1999 | Rekieta et al. | |
| 5,987,622 A | 11/1999 | Lo Verso et al. | |
| 5,991,414 A | 11/1999 | Garay et al. | |
| 6,012,159 A | 1/2000 | Fischer et al. | |
| 6,058,454 A | 5/2000 | Gerlach et al. | |
| 6,128,277 A | 10/2000 | Bruck et al. | |
| 6,175,571 B1 | 1/2001 | Haddock et al. | |
| 6,192,472 B1 | 2/2001 | Garay et al. | |
| 6,256,688 B1 | 7/2001 | Suetaka et al. | |
| 6,272,658 B1 | 8/2001 | Steele et al. | |
| 6,301,604 B1 | 10/2001 | Nojima | |
| 6,356,949 B1 | 3/2002 | Katsandres et al. | |
| 6,366,995 B1 | 4/2002 | Vilkov et al. | |
| 6,374,336 B1 | 4/2002 | Peters et al. | |
| 6,415,373 B1 | 7/2002 | Peters et al. | |
| 6,418,539 B1 | 7/2002 | Walker | |
| 6,449,688 B1 | 9/2002 | Peters et al. | |
| 6,567,948 B2 | 5/2003 | Steele et al. | |

(Continued)

OTHER PUBLICATIONS

Shamir; How to Share a Secret; Communications of the ACM; vol. 22, No. 11; Nov. 1979; pp. 612-613.

(Continued)

*Primary Examiner* — Guerrier Merant
(74) *Attorney, Agent, or Firm* — Garlick & Markison; Jessica W. Smith

(57) ABSTRACT

A distributed storage network generates a plurality of data segments from a data object and stores each of the plurality of data segments as a plurality of encoded data slices generated from an error encoding dispersal function. When the distributed storage network receives a modification request for the data object, it determines a size of the plurality of data segments of the data object from a segment size field and identifies one of the plurality of data segments requiring modification. The identified data segment is reconstructed from the plurality of encoded data slices and modified in accordance with the modification request.

20 Claims, 11 Drawing Sheets

U.S. PATENT DOCUMENTS

| | | | |
|---|---|---|---|
| 6,571,282 | B1 | 5/2003 | Bowman-Amuah |
| 6,609,223 | B1 | 8/2003 | Wolfgang |
| 6,718,361 | B1 | 4/2004 | Basani et al. |
| 6,760,808 | B2 | 7/2004 | Peters et al. |
| 6,785,768 | B2 | 8/2004 | Peters et al. |
| 6,785,783 | B2 | 8/2004 | Buckland |
| 6,826,711 | B2 | 11/2004 | Moulton et al. |
| 6,879,596 | B1 | 4/2005 | Dooply |
| 7,003,688 | B1 | 2/2006 | Pittelkow et al. |
| 7,024,451 | B2 | 4/2006 | Jorgenson |
| 7,024,609 | B2 | 4/2006 | Wolfgang et al. |
| 7,080,101 | B1 | 7/2006 | Watson et al. |
| 7,103,824 | B2 | 9/2006 | Halford |
| 7,103,915 | B2 | 9/2006 | Redlich et al. |
| 7,111,115 | B2 | 9/2006 | Peters et al. |
| 7,140,044 | B2 | 11/2006 | Redlich et al. |
| 7,146,644 | B2 | 12/2006 | Redlich et al. |
| 7,171,493 | B2 | 1/2007 | Shu et al. |
| 7,222,133 | B1 | 5/2007 | Raipurkar et al. |
| 7,240,236 | B2 | 7/2007 | Cutts et al. |
| 7,272,613 | B2 | 9/2007 | Sim et al. |
| 2002/0062422 | A1 | 5/2002 | Butterworth et al. |
| 2002/0166079 | A1 | 11/2002 | Ulrich et al. |
| 2003/0018927 | A1 | 1/2003 | Gadir et al. |
| 2003/0033308 | A1* | 2/2003 | Patel et al. ............ 707/10 |
| 2003/0037261 | A1 | 2/2003 | Meffert et al. |
| 2003/0065617 | A1 | 4/2003 | Watkins et al. |
| 2003/0084020 | A1 | 5/2003 | Shu |
| 2004/0024963 | A1 | 2/2004 | Talagala et al. |
| 2004/0122917 | A1 | 6/2004 | Menon et al. |
| 2004/0215998 | A1 | 10/2004 | Buxton et al. |
| 2004/0228493 | A1 | 11/2004 | Ma et al. |
| 2005/0100022 | A1 | 5/2005 | Ramprashad |
| 2005/0114594 | A1 | 5/2005 | Corbett et al. |
| 2005/0125593 | A1 | 6/2005 | Karpoff et al. |
| 2005/0131993 | A1 | 6/2005 | Fatula, Jr. |
| 2005/0132070 | A1 | 6/2005 | Redlich et al. |
| 2005/0144382 | A1 | 6/2005 | Schmisseur |
| 2005/0229069 | A1 | 10/2005 | Hassner |
| 2006/0047907 | A1 | 3/2006 | Shiga et al. |
| 2006/0136448 | A1 | 6/2006 | Cialini et al. |
| 2006/0156059 | A1 | 7/2006 | Kitamura |
| 2006/0224603 | A1 | 10/2006 | Correll, Jr. |
| 2007/0079081 | A1 | 4/2007 | Gladwin et al. |
| 2007/0079082 | A1 | 4/2007 | Gladwin et al. |
| 2007/0079083 | A1 | 4/2007 | Gladwin et al. |
| 2007/0088970 | A1 | 4/2007 | Buxton et al. |
| 2007/0174192 | A1 | 7/2007 | Gladwin et al. |
| 2007/0214285 | A1 | 9/2007 | Au et al. |
| 2007/0234110 | A1 | 10/2007 | Soran et al. |
| 2007/0283167 | A1 | 12/2007 | Venters, III et al. |
| 2009/0094251 | A1 | 4/2009 | Gladwin et al. |
| 2009/0094318 | A1 | 4/2009 | Gladwin et al. |
| 2010/0023524 | A1 | 1/2010 | Gladwin et al. |
| 2011/0029836 | A1* | 2/2011 | Dhuse et al. ............ 714/752 |

OTHER PUBLICATIONS

Rabin; Efficient Dispersal of Information for Security, Load Balancing, and Fault Tolerance; Journal of the Association for Computer Machinery; vol. 36, No. 2; Apr. 1989; pp. 335-348.

Chung; An Automatic Data Segmentation Method for 3D Measured Data Points; National Taiwan University; pp. 1-8; 1998.

Plank, T1: Erasure Codes for Storage Applications; FAST2005, 4th Usenix Conference on File Storage Technologies; Dec. 13-16, 2005; pp. 1-74.

Wildi; Java iSCSi Initiator; Master Thesis; Department of Computer and Information Science, University of Konstanz; Feb. 2007; 60 pgs.

Legg; Lightweight Directory Access Protocol (LDAP): Syntaxes and Matching Rules; IETF Network Working Group; RFC 4517; Jun. 2006; pp. 1-50.

Zeilenga; Lightweight Directory Access Protocol (LDAP): Internationalized String Preparation; IETF Network Working Group; RFC 4518; Jun. 2006; pp. 1-14.

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

Zeilenga; Lightweight Directory Access Protocol (LDAP): Directory Information Models; IETF Network Working Group; RFC 4512; Jun. 2006; pp. 1-49.

Sciberras; Lightweight Directory Access Protocol (LDAP): Schema for User Applications; IETF Network Working Group; RFC 4519; Jun. 2006; pp. 1-33.

Harrison; Lightweight Directory Access Protocol (LDAP): Authentication Methods and Security Mechanisms; IETF Network Working Group; RFC 4513; Jun. 2006; pp. 1-32.

Zeilenga; Lightweight Directory Access Protocol (LDAP): Technical Specification Road Map; IETF Network Working Group; RFC 4510; Jun. 2006; pp. 1-8.

Zeilenga; Lightweight Directory Access Protocol (LDAP): String Representation of Distinguished Names; IETF Network Working Group; RFC 4514; Jun. 2006; pp. 1-15.

Sermersheim; Lightweight Directory Access Protocol (LDAP): The Protocol; IETF Network Working Group; RFC 4511; Jun. 2006; pp. 1-68.

Satran, et al.; Internet Small Computer Systems Interface (iSCSI); IETF Network Working Group; RFC 3720; Apr. 2004; pp. 1-257.

Xin, et al.; Evaluation of Distributed Recovery in Large-Scale Storage Systems; 13th IEEE International Symposium on High Performance Distributed Computing; Jun. 2004; pp. 172-181.

* cited by examiner

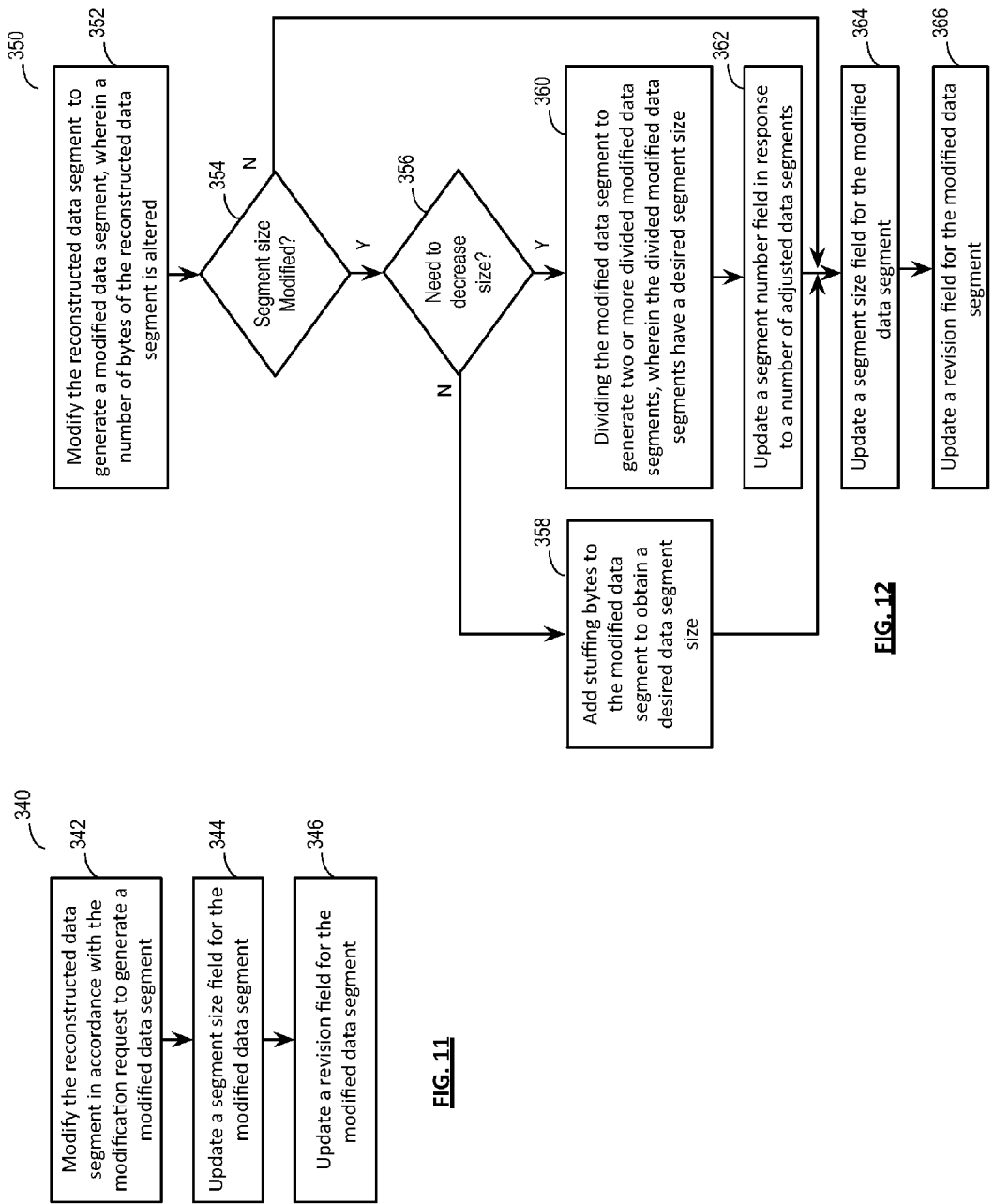

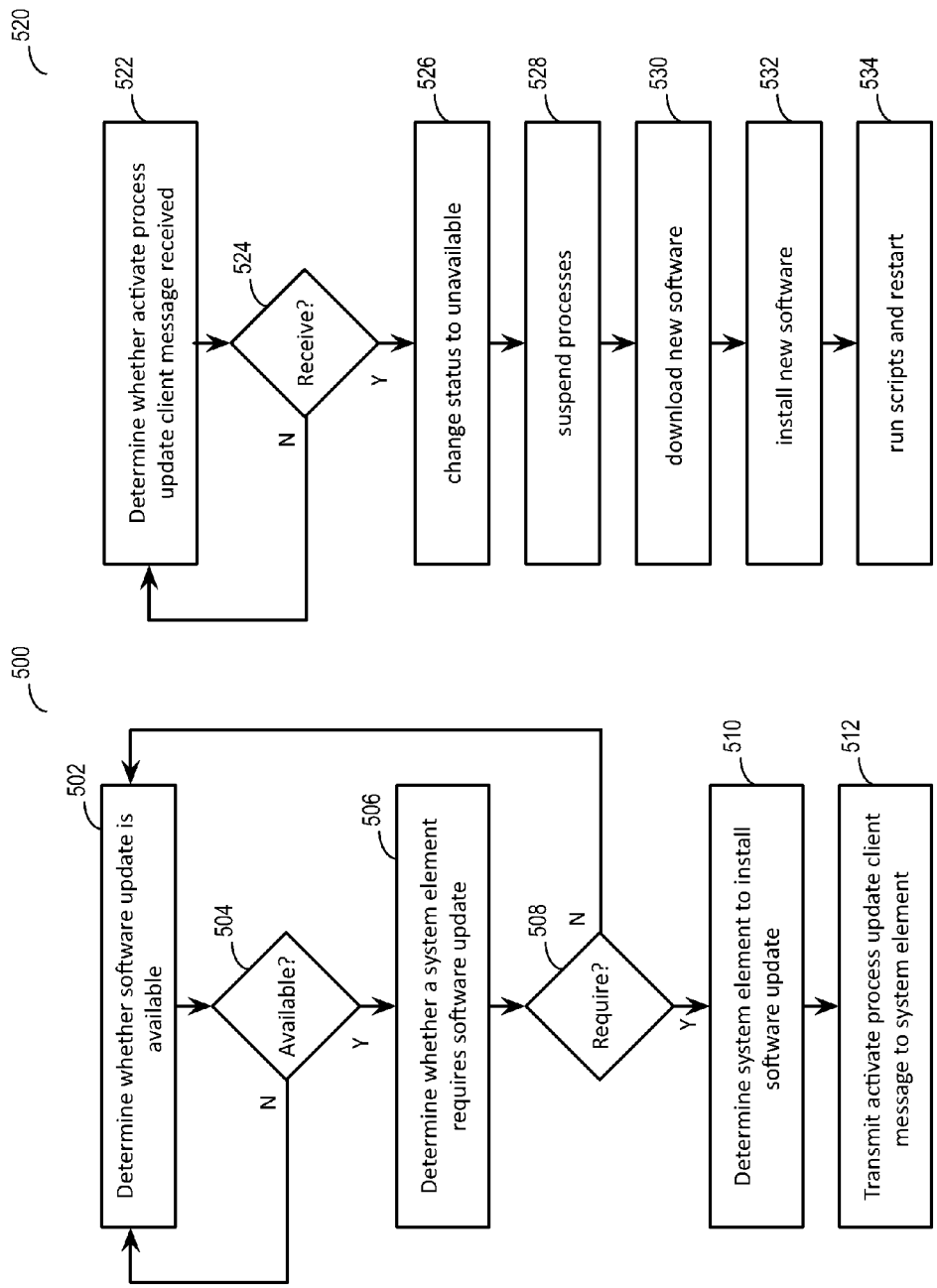

DISTRIBUTED STORAGE NETWORK FOR MODIFICATION OF A DATA OBJECT

CROSS-REFERENCE TO RELATED PATENTS

This U.S. Utility patent application claims priority pursuant to 35 U.S.C. §119(e) to U.S. Provisional Application Ser. No. 61/256,436 entitled "DISTRIBUTED STORAGE NETWORK ACCESS," filed Oct. 30, 2009, pending, which is incorporated by reference herein in its entirety and made part of the present U.S. Utility patent application for all purposes.

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND OF THE INVENTION

1. Technical Field of the Invention

This invention relates generally to computing systems and more particularly to data storage within such computing systems.

2. Description of Related Art

This invention relates generally to computing systems and more particularly to data storage solutions within such computing systems.

DESCRIPTION OF RELATED ART

Computers are known to communicate, process, and store data. Such computers range from wireless smart phones to data centers that support millions of web searches, stock trades, or on-line purchases every day. In general, a computing system generates data and/or manipulates data from one form into another. For instance, an image sensor of the computing system generates raw picture data and using an image compression program (e.g., JPEG, MPEG, etc.), the computing system manipulates the raw picture data into a standardized compressed image.

With continued advances in processing speed and communication speed, computers are capable of processing real time multimedia data for applications ranging from simple voice communications to streaming high definition video. As such, general-purpose information appliances are replacing purpose-built communications devices (e.g., a telephone). For example, smart phones can support telephony communications but they are also capable of text messaging and accessing the internet to perform functions including email, web browsing, remote applications access, and media communications (e.g., telephony voice, image transfer, music files, video files, real time video streaming, etc.).

Each type of computer is constructed and operates in accordance with one or more communication, processing, and storage standards. As a result of standardization and with advances in technology, more and more information content is being converted into digital formats. For example, more digital cameras are now being sold than film cameras, thus producing more digital pictures. As another example, web-based programming is becoming an alternative to over the air television broadcasts and/or cable broadcasts. As further examples, papers, books, video entertainment, home video, etc. are now being stored digitally. This increased storage of information content increases the demand on the storage function of computers.

A typical computer storage system includes one or more memory devices aligned with the needs of the various operational aspects of the computer's processing and communication functions. Generally, the immediacy of access dictates what type of memory device is used. For example, random access memory (RAM) memory can be accessed in any random order with a constant response time, thus it is typically used for cache memory and main memory. By contrast, memory device technologies that require physical movement such as magnetic disks, tapes, and optical discs, have a variable response time as the physical movement can take longer than the data transfer, thus they are typically used for secondary memory (e.g., hard drive, backup memory, etc.).

A computer's storage system will be compliant with one or more computer storage standards that include, but are not limited to, network file system (NFS), flash file system (FFS), disk file system (DFS), small computer system interface (SCSI), internet small computer system interface (iSCSI), file transfer protocol (FTP), and web-based distributed authoring and versioning (WebDAV). These standards specify the data storage format (e.g., files, data objects, data blocks, directories, etc.) and interfacing between the computer's processing function and its storage system, which is a primary function of the computer's memory controller.

Despite the standardization of the computer and its storage system, memory devices fail; especially commercial grade memory devices that utilize technologies incorporating physical movement (e.g., a disc drive). For example, it is fairly common for a disc drive to routinely suffer from bit level corruption and to completely fail after three years of use. One solution is to a higher-grade disc drive, which adds significant cost to a computer.

Another solution is to utilize multiple levels of redundant disc drives to replicate the data into two or more copies. One such redundant drive approach is called redundant array of independent discs (RAID). In a RAID device, a RAID controller adds parity data to the original data before storing it across the array. The parity data is calculated from the original data such that the failure of a disc will not result in the loss of the original data. For example, RAID 5 uses three discs to protect data from the failure of a single disc. The parity data, and associated redundancy overhead data, reduces the storage capacity of three independent discs by one third (e.g., n−1=capacity). RAID 6 can recover from a loss of two discs and requires a minimum of four discs with a storage capacity of n−2.

While RAID addresses the memory device failure issue, it is not without its own failures issues that affect its effectiveness, efficiency and security. For instance, as more discs are added to the array, the probability of a disc failure increases, which increases the demand for maintenance. For example, when a disc fails, it needs to be manually replaced before another disc fails and the data stored in the RAID device is lost. To reduce the risk of data loss, data on a RAID device is typically copied on to one or more other RAID devices. While this addresses the loss of data issue, it raises a security issue since multiple copies of data are available, which increases the chances of unauthorized access. Further, as the amount of data being stored grows, the overhead of RAID devices becomes a non-trivial efficiency issue.

BRIEF DESCRIPTION OF THE SEVERAL VIEWS OF THE DRAWING(S)

FIG. 11 is a logic flow diagram of another embodiment of a method for modifying a data object in accordance with the invention;

FIG. 12 is a logic flow diagram of another embodiment of a method for modifying a data object in accordance with the invention;

FIG. 17 is a logic flow diagram of an embodiment of a method for updating a system element in accordance with the invention; and FIG. 18 is a logic flow diagram of another embodiment of a method for updating a system element in accordance with the invention.

DETAILED DESCRIPTION OF THE INVENTION

Figure 1:
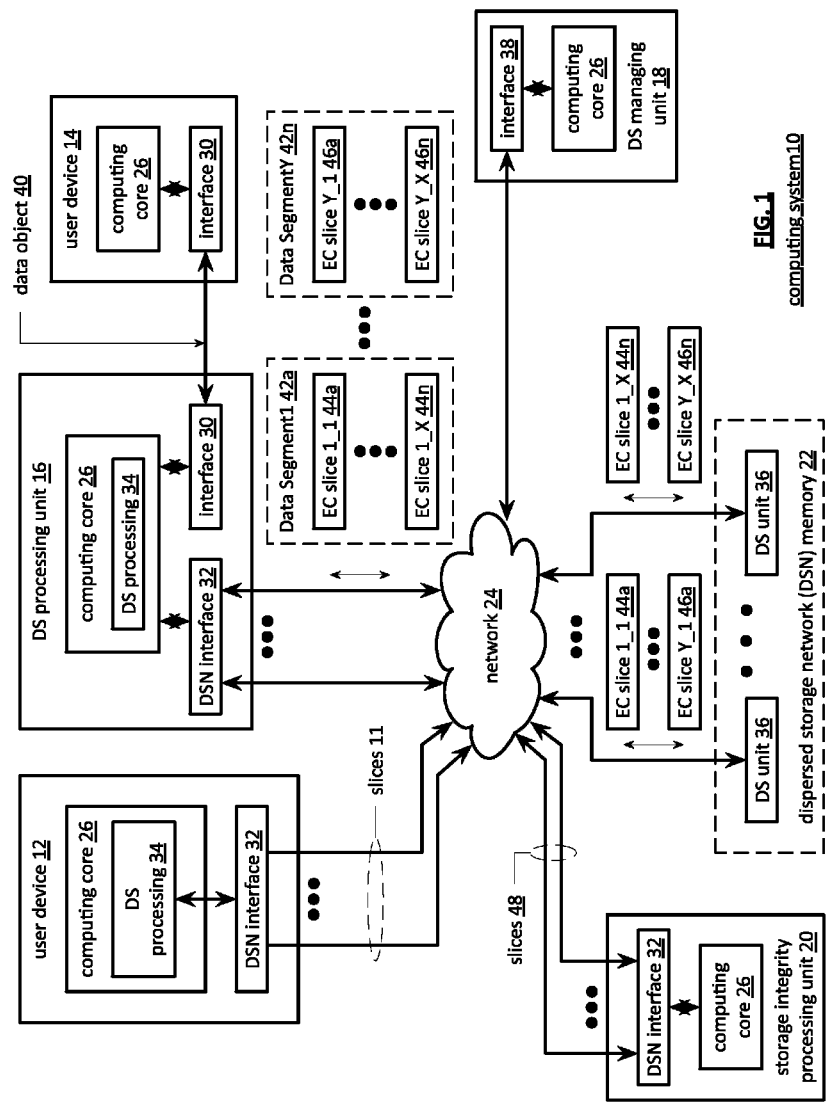
FIG. 1 is a schematic block diagram of an embodiment of a computing system in accordance with the invention.

FIG. 1 is a schematic block diagram of a computing system 10 that includes one or more of a first type of user devices 12, one or more of a second type of user devices 14, at least one distributed storage (DS) processing unit 16, at least one DS managing unit 18, at least one storage integrity processing unit 20, and a distributed storage network (DSN) memory 22 coupled via a network 24. The network 24 may include one or more wireless and/or wire lined communication systems; one or more private intranet systems and/or public internet systems; and/or one or more local area networks (LAN) and/or wide area networks (WAN).

The DSN memory 22 includes a plurality of distributed storage (DS) units 36 for storing data of the system. Each of the DS units 36 includes a processing module and memory and may be located at a geographically different site than the other DS units (e.g., one in Chicago, one in Milwaukee, etc.). The processing module may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module may have an associated memory and/or memory element, which may be a single memory device, a plurality of memory devices, and/or embedded circuitry of the processing module. Such a memory device may be a read-only memory, random access memory, volatile memory, non-volatile memory, static memory, dynamic memory, flash memory, cache memory, and/or any device that stores digital information. Note that if the processing module includes more than one processing device, the processing devices may be centrally located (e.g., directly coupled together via a wired and/or wireless bus structure) or may be distributedly located (e.g., cloud computing via indirect coupling via a local area network and/or a wide area network). Further note that when the processing module implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element stores, and the processing module executes, hard coded and/or operational instructions corresponding to at least some of the steps and/or functions illustrated in FIGS. 1-18.

Each of the user devices 12-14, the DS processing unit 16, the DS managing unit 18, and the storage integrity processing unit 20 may be a portable computing device (e.g., a social networking device, a gaming device, a cell phone, a smart phone, a personal digital assistant, a digital music player, a digital video player, a laptop computer, a handheld computer, a video game controller, and/or any other portable device that includes a computing core) and/or a fixed computing device (e.g., a personal computer, a computer server, a cable set-top box, a satellite receiver, a television set, a printer, a fax machine, home entertainment equipment, a video game console, and/or any type of home or office computing equipment). Such a portable or fixed computing device includes a computing core 26 and one or more interfaces 30, 32, and/or 38. An embodiment of the computing core 26 will be described with reference to FIG. 2.

With respect to the interfaces, each of the interfaces 30, 32, and 38 includes software and/or hardware to support one or more communication links via the network 24 and/or directly. For example, interfaces 30 support a communication link (wired, wireless, direct, via a LAN, via the network 24, etc.) between the first type of user device 14 and the DS processing unit 16. As another example, DSN interface 32 supports a plurality of communication links via the network 24 between the DSN memory 22 and the DS processing unit 16, the first type of user device 12, and/or the storage integrity processing unit 20. As yet another example, interface 38 supports a communication link between the DS managing unit 18 and any one of the other devices and/or units 12, 14, 16, 20, and/or 22 via the network 24.

In general and with respect to data storage, the system 10 supports three primary functions: distributed network data storage management, distributed data storage and retrieval, and data storage integrity verification. In accordance with these three primary functions, data can be distributedly stored in a plurality of physically different locations and subsequently retrieved in a reliable and secure manner regardless of failures of individual storage devices, failures of network equipment, the duration of storage, the amount of data being stored, attempts at hacking the data, etc.

The DS managing unit 18 performs distributed network data storage management functions, which include establishing distributed data storage parameters, performing network operations, performing network administration, and/or performing network maintenance. The DS managing unit 18 establishes the distributed data storage parameters (e.g., allocation of virtual DSN memory space, distributed storage parameters, security parameters, billing information, user profile information, etc.) for one or more of the user devices 12-14 (e.g., established for individual devices, established for a user group of devices, established for public access by the user devices, etc.). For example, the DS managing unit 18 coordinates the creation of a vault (e.g., a virtual memory block) within the DSN memory 22 for a user device (for a group of devices, or for public access). The DS managing unit 18 also determines the distributed data storage parameters for the vault. In particular, the DS managing unit 18 determines a number of slices (e.g., the number that a data segment of a data file and/or data block is partitioned into for distributed storage) and a read threshold value (e.g., the minimum number of slices required to reconstruct the data segment).

As another example, the DS managing module 18 creates and stores, locally or within the DSN memory 22, user profile information. The user profile information includes one or more of authentication information, permissions, and/or the security parameters. The security parameters may include one or more of encryption/decryption scheme, one or more encryption keys, key generation scheme, and data encoding/decoding scheme.

As yet another example, the DS managing unit 18 creates billing information for a particular user, user group, vault access, public vault access, etc. For instance, the DS managing unit 18 tracks the number of times user accesses a private vault and/or public vaults, which can be used to generate a per-access bill. In another instance, the DS managing unit 18 tracks the amount of data stored and/or retrieved by a user device and/or a user group, which can be used to generate a per-data-amount bill.

The DS managing unit 18 also performs network operations, network administration, and/or network maintenance. As at least part of performing the network operations and/or administration, the DS managing unit 18 monitors performance of the devices and/or units of the system 10 for potential failures, determines the devices and/or unit's activation status, determines the devices' and/or units' loading, and any other system level operation that affects the performance level of the system 10. For example, the DS managing unit 18 receives and aggregates network management alarms, alerts, errors, status information, performance information, and messages from the devices 12-14 and/or the units 16, 20, 22. For example, the DS managing unit 18 receives a simple network management protocol (SNMP) message regarding the status of the DS processing unit 16.

The DS managing unit 18 performs the network maintenance by identifying equipment within the system 10 that needs replacing, upgrading, repairing, and/or expanding. For example, the DS managing unit 18 determines that the DSN memory 22 needs more DS units 36 or that one or more of the DS units 36 needs updating.

The second primary function (i.e., distributed data storage and retrieval) begins and ends with a user device 12-14. For instance, if a second type of user device 14 has a data object 40, such as a data file and/or data block, to store in the DSN memory 22, it sends the data object 40 to the DS processing unit 16 via its interface 30. As will be described in greater detail with reference to FIG. 2, the interface 30 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). In addition, the interface 30 may attach a user identification code (ID) to the data object 40.

The DS processing unit 16 receives the data object 40 via its interface 30 and performs a distributed storage (DS) process 34 thereon (e.g., an error coding dispersal storage function). The DS processing 34 begins by partitioning the data object 40 into one or more data segments, which is represented as Y data segments. The DS processing 34 may partition the data object 40 into fixed byte size segments (e.g., 21 to 2n bytes, where n=>2) or variable byte size segments (e.g., change byte size from segment to segment, or from groups of segments to groups of segments, etc.).

For example, in FIG. 1 for each of the Y number of data segments 42*a-n*, the DS processing 34 error encodes (e.g., forward error correction (FEC), information dispersal algorithm, or error correction coding) and slices (or slices then error encodes) the data segments 42*a-n* into a plurality of error coded (EC) data slices 42*a*-42*n* and 46*a*-46*n*, which are represented as X slices per data segment. The number of slices (X) per segment, which corresponds to a number of pillars n, is set in accordance with the distributed data storage parameters and the error coding scheme. For example, if a Reed-Solomon (or other FEC scheme) is used in an X/T system, then a data segment is divided into X number of slices, where T number of slices are needed to reconstruct the original data (i.e., T is the threshold). As a few specific examples, the X/T factor may be 5/3; 6/4; 8/6; 8/5; 16/10.

For each slice 44*a-n* and 46*a-n*, the DS processing unit 16 creates a unique slice name and appends it to the corresponding slice. The slice name includes universal DSN memory addressing routing information (e.g., virtual memory addresses in the DSN memory 22) and user-specific information (e.g., user ID, file name, data block identifier, etc.).

The DS processing unit 16 transmits the plurality of EC slices 44*a-n* and 46*a-n* to a plurality of DS units 36 of the DSN memory 22 via the DSN interface 32 and the network 24. The DSN interface 32 formats each of the slices for transmission via the network 24. For example, the DSN interface 32 may utilize an internet protocol (e.g., TCP/IP, etc.) to packetize the slices 44*a-n* and 46*a-n* for transmission via the network 24.

The number of DS units 36 receiving the slices 44*a-n* and 46*a-n* is dependent on the distributed data storage parameters established by the DS managing unit 18. For example, the DS managing unit 18 may indicate that each slice is to be stored in a different DS unit 36. As another example, the DS managing unit 18 may indicate that like slice numbers of different data segments are to be stored in the same DS unit 36. For example, the first slice 44*a* and 46*a* of each of the data segments 42*a-n* is to be stored in a first DS unit 36, the second slice 44*b* and 46*b* of each of the data segments 42*a-n* is to be stored in a second DS unit 36, etc. In this manner, the data is encoded and distributedly stored at physically diverse locations to improved data storage integrity and security. Further examples of encoding the data segments will be provided with reference to one or more of FIGS. 2-18.

Each DS unit 36 that receives a slice for storage translates the virtual DSN memory address of the slice into a local physical address for storage. Accordingly, each DS unit 36 maintains a virtual to physical memory mapping to assist in the storage and retrieval of data.

The first type of user device 12 performs a similar function to store data in the DSN memory 22 with the exception that it includes the DS processing. As such, the device 12 encodes and slices the data file and/or data block it has to store. The device then transmits the slices 11 to the DSN memory via its DSN interface 32 and the network 24.

For a second type of user device 14 to retrieve a data file or data block from memory, it issues a read command via its interface 30 to the DS processing unit 16. The DS processing unit 16 performs the DS processing 34 to identify the DS units 36 storing the slices of the data file and/or data block based on the read command. The DS processing unit 16 may also communicate with the DS managing unit 18 to verify that the user device 14 is authorized to access the requested data.

Assuming that the user device is authorized to access the requested data, the DS processing unit 16 issues slice read commands to at least a threshold number of the DS units 36 storing the requested data (e.g., to at least 10 DS units for a 16/10 error coding scheme). Each of the DS units 36 receiving the slice read command, verifies the command, accesses its virtual to physical memory mapping, retrieves the requested slice, or slices, and transmits it to the DS processing unit 16.

Once the DS processing unit 16 has received a read threshold number of slices for a data segment, it performs an error decoding function and de-slicing to reconstruct the data segment. When Y number of data segments has been reconstructed, the DS processing unit 16 provides data object 40 to the user device 14. Note that the first type of user device 12 performs a similar process to retrieve data object 40.

The storage integrity processing unit 20 performs the third primary function of data storage integrity verification. In general, the storage integrity processing unit 20 periodically retrieves slices 48, and/or slice names, of a data object 40 to verify that one or more slices have not been corrupted or lost (e.g., the DS unit failed). The retrieval process mimics the read process previously described.

If the storage integrity processing unit 20 determines that one or more slices 48 is corrupted or lost, it rebuilds the corrupted or lost slice(s) in accordance with the error coding scheme. The storage integrity processing unit 20 stores the rebuilt slice, or slices, in the appropriate DS unit(s) 36 in a manner that mimics the write process previously described.

Figure 2:
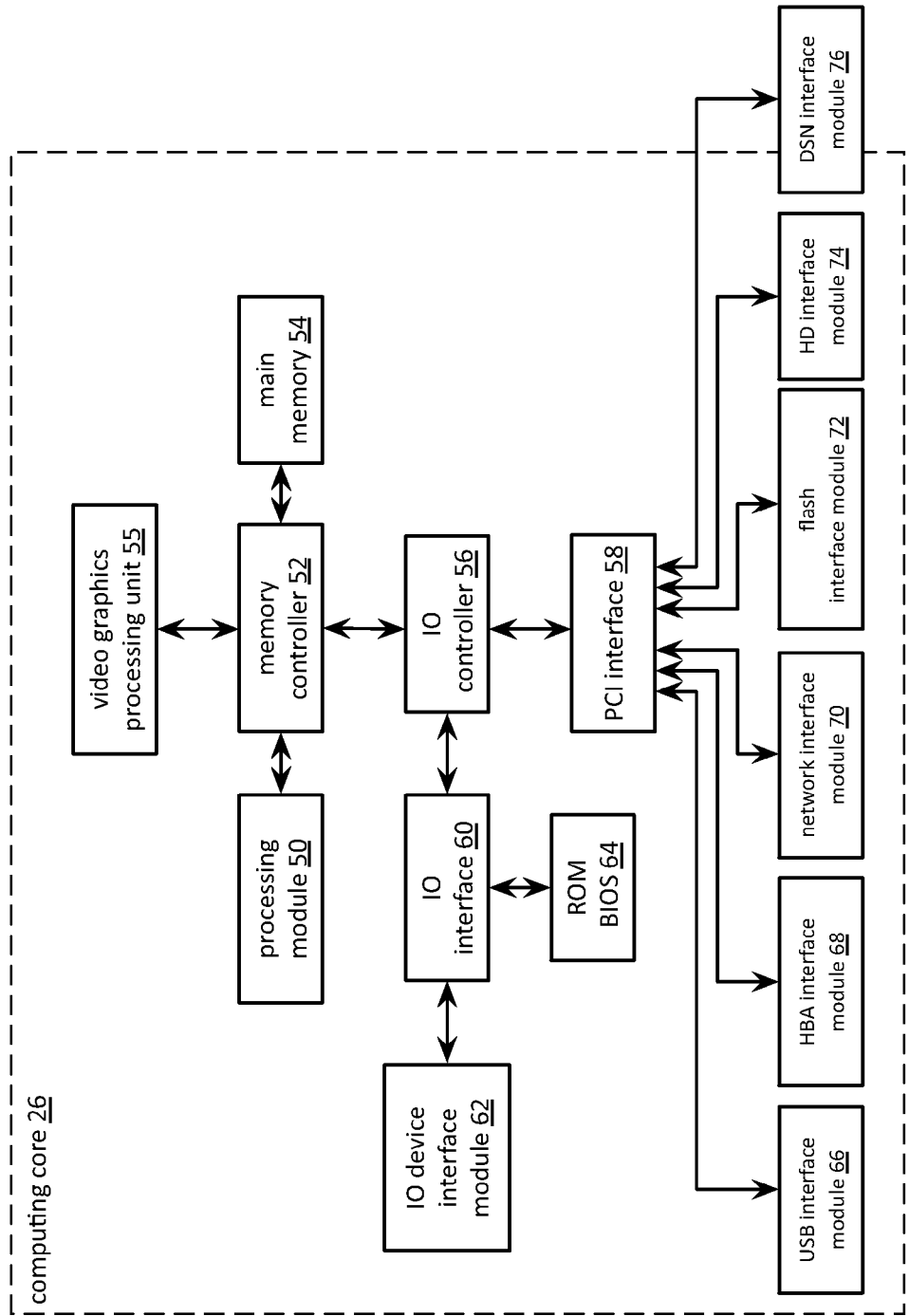
FIG. 2 is a schematic block diagram of an embodiment of a computing core in accordance with the invention.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, at least one IO interface 60, 10 device interface module 62, a read only memory (ROM) basic input output system (BIOS) 64, and one or more memory interface modules. The memory interface module(s) includes one or more of a universal serial bus (USB) interface module 66, a host bus adapter (HBA) interface module 68, a network interface module 70, a flash interface module 72, a hard drive interface module 74, and a DSN interface module 76. Note the DSN interface module 76 and/or the network interface module 70 may function as the interface 30 of the user device 14 of FIG. 1. Further note that the IO device interface module 62 and/or the memory interface modules may be collectively or individually referred to as IO ports.

The processing module 50 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module 50 may have an associated memory and/or memory element, which may be a single memory device, a plurality of memory devices, and/or embedded circuitry of the processing module 50. Such a memory device may be a read-only memory, random access memory, volatile memory, non-volatile memory, static memory, dynamic memory, flash memory, cache memory, and/or any device that stores digital information. Note that if the processing module 50 includes more than one processing device, the processing devices may be centrally located (e.g., directly coupled together via a wired and/or wireless bus structure) or may be distributedly located (e.g., cloud computing via indirect coupling via a local area network and/or a wide area network). Further note that when the processing module 50 implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element stores, and the processing module 50 executes, hard coded and/or operational instructions corresponding to at least some of the steps and/or functions illustrated in FIGS. 1-18.

Figure 3:
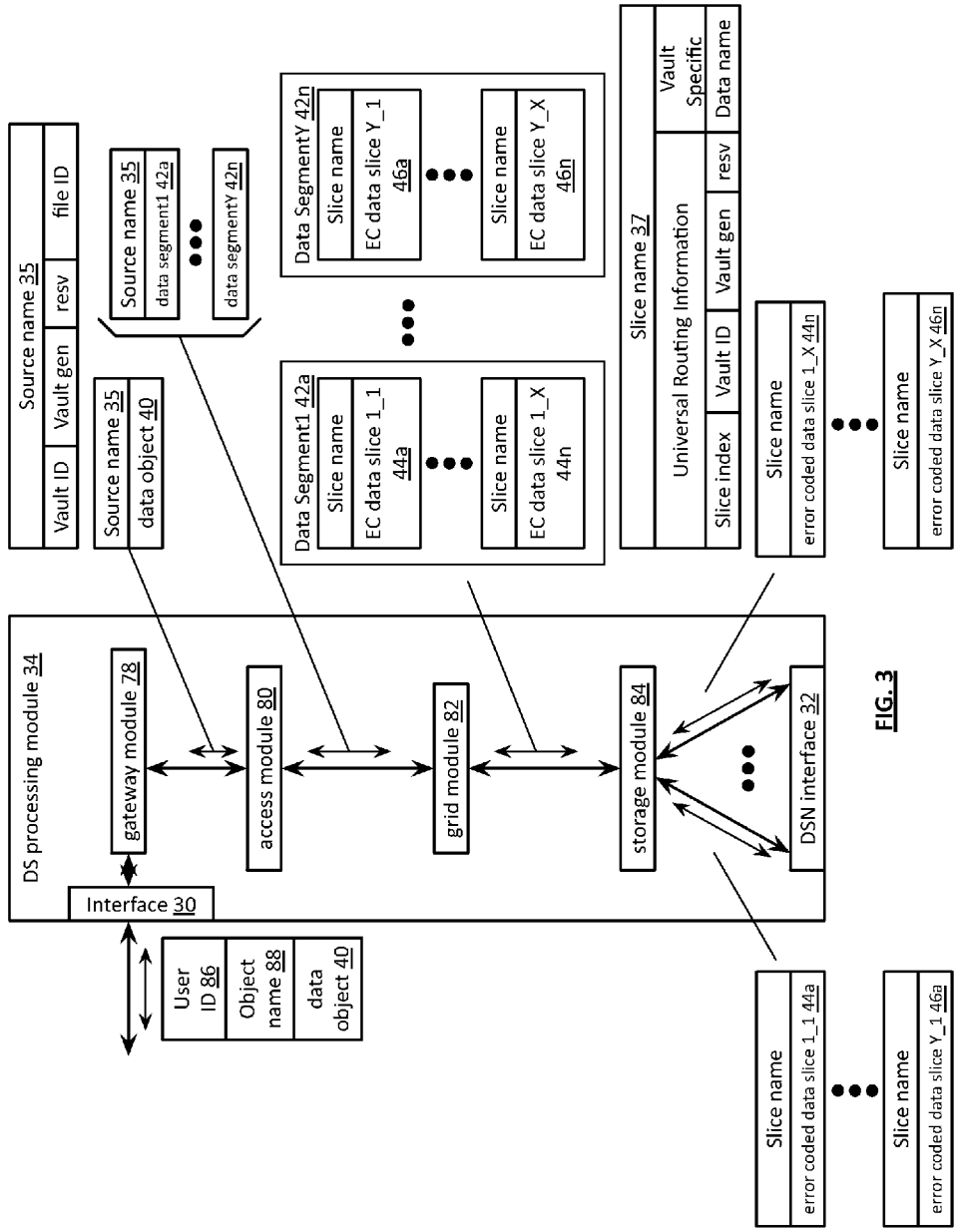
FIG. 3 is a schematic block diagram of an embodiment of a distributed storage processing unit in accordance with the invention.

FIG. 3 is a schematic block diagram of an embodiment of a dispersed storage (DS) processing module 34 of user device 12 and/or of the DS processing unit 16. The DS processing module 34 includes a gateway module 78, an access module 80, a grid module 82, and a storage module 84. The DS processing module 34 may also include an interface 30 and DSN interface 32 or the interfaces 30 and/or 32 may be part of user 12 or of the DS processing unit 14. The DS processing module 34 may further include a bypass/feedback path between the storage module 84 to the gateway module 78. Note that the modules 78-84 of the DS processing module 34 may be in a single unit or distributed across multiple units.

In an example of storing data, the gateway module 78 receives an incoming request with a data object 40. The incoming request may also include a user ID field 86, an object name field 88 and other corresponding information such as a process identifier (e.g., an internal process/application ID), metadata, a file system directory, a block number, a transaction message, a user device identity (ID), a data object identifier, a source name, and/or user information. The gateway module 78 authenticates the user associated with the data object by verifying the user ID 86 with the managing unit 18 and/or another authenticating unit.

When the user is authenticated, the gateway module 78 obtains user information from the management unit 18, the user device 12-Source 14, and/or the other authenticating unit. The user information includes a vault identifier, operational parameters, and user attributes (e.g., user data, billing information, etc.). A vault identifier identifies a vault, which is a virtual memory space that maps to a set of DS storage units 36. For example, vault 1 (i.e., user 1's DSN memory space) includes eight DS storage units (X=8 wide) and vault 2 (i.e., user 2's DSN memory space) includes sixteen DS storage units (X=16 wide). The operational parameters may include an error coding algorithm, the width n (number of pillars X or slices per segment for this vault), a read threshold T, a write threshold, an encryption algorithm, a slicing parameter, a compression algorithm, an integrity check method, caching settings, parallelism settings, and/or other parameters that may be used to access the DSN memory layer.

The gateway module 78 uses the user information to assign a source name 35 to the data object 40. For instance, the gateway module 60 determines the source name 35 of the data object 40 based on the vault identifier and the data object 40. For example, the source name may contain a file identifier (ID), a vault generation number, a reserved field, and a vault identifier (ID). As another example, the gateway module 78 may generate the file ID based on a hash function of the data object 40. Note that the gateway module 78 may also perform message conversion, protocol conversion, electrical conversion, optical conversion, access control, user identification, user information retrieval, traffic monitoring, statistics generation, configuration, management, and/or source name determination.

The access module 80 receives the data object 40 and creates a plurality of data segments 1 through Y 42a-n in accordance with a data storage protocol (e.g., file storage system, a block storage system, and/or an aggregated block storage system). The number Y of data segments may be fixed with a segment size depending on the data object size or the number of segments may vary with a fixed segment size. For example, when the number Y of segments is chosen to be a fixed number, then the size of the segments varies as a function of the size of the data object. For instance, if the data object is an image file of 4,194,304 eight bit bytes (e.g., 33,554,432 bits) and the number of segments Y=131,072, then each segment is 256 bits or 32 bytes. As another example, when the segment size is fixed, then the number of segments Y varies based on the size of data object. For instance, if the data object is an image file of 4,194,304 bytes and the fixed segment size of each segment is 4,096 bytes, then the number of segments Y=1,024. Note that each segment is associated with the same source name 35.

The grid module 82 receives the Y data segments and may manipulate (e.g., compression, encryption, cyclic redundancy check (CRC), etc.) each of the data segments before performing an error coding function of the error coding dispersal storage function to produce a pre-manipulated data segment. After manipulating a data segment, if applicable, the grid module 82 error encodes (e.g., Reed-Solomon, Convolution encoding, Trellis encoding, etc.) the data segment or manipulated data segment into X error coded data slices 42-44.

The value X, or the number of pillars (e.g., X=16), is chosen as a parameter of the error coding dispersal storage function. Other parameters of the error coding dispersal function include a read threshold T, a write threshold W, etc. The read threshold (e.g., T=10, when X=16) corresponds to the minimum number of error coded data slices required to reconstruct the data segment. In other words, the DS processing module 34 can compensate for X−T (e.g., 16−10=6) missing error coded data slices per data segment. The write threshold W corresponds to a minimum number of DS storage units that acknowledge proper storage of their respective data slices before the DS processing module indicates proper storage of the encoded data segment. Note that the write threshold W is greater than or equal to the read threshold T (i.e., W≧T) for a given number of pillars (X).

For each data slice of a data segment, the grid module 82 generates a unique slice name 37 and attaches it thereto. The slice name 37 includes a universal routing information field and a vault specific field and may be 48 bytes (e.g., 24 bytes for each of the universal routing information field and the vault specific field). As illustrated, the universal routing information field includes a slice index, a vault ID, a vault generation, and a reserved field. The slice index is based on the pillar number n and the vault ID and, as such, is unique for each pillar (e.g., slices of the same pillar for the same vault for any segment will share the same slice index). The vault specific field includes a data name, which includes a file ID and a segment number (e.g., a sequential numbering of data segments 1-Y of a simple data object or a data block number).

Prior to outputting the error coded data slices of a data segment, the grid module may perform post-slice manipulation on the slices. If enabled, the manipulation includes slice level compression, encryption, CRC, addressing, tagging, and/or other manipulation to improve the effectiveness of the computing system.

When the error coded (EC) data slices of a data segment are ready for storage, the grid module 82 determines which of the DS storage units 36 will store the EC data slices based on a dispersed storage memory mapping associated with the user's vault and/or DS storage unit 36 attributes. The DS storage unit attributes may include availability, self-selection, performance history, link speed, link latency, ownership, available DSN memory, domain, cost, a prioritization scheme, a centralized selection message from another source, a lookup table, data ownership, and/or any other factor to optimize the operation of the computing system. Note that the number of DS storage units 36 in an embodiment is equal to or greater than the number of pillars (e.g., X) so that no more than one error coded data slice of the same data segment is stored on the same DS storage unit 36. Further note that EC data slices of the same pillar number but of different segments (e.g., EC data slice 1 of data segment 1 and EC data slice 1 of data segment 2) may be stored on the same or different DS storage units 36.

The storage module 84 performs an integrity check on the outbound encoded data slices and, when successful, identifies a plurality of DS storage units based on information provided by the grid module. The storage module then outputs the encoded data slices 1 through X of each segment 1 through Y to the DS storage units. Each of the DS storage units 36 stores its EC data slice(s) and maintains a local virtual DSN address to physical location table to convert the virtual DSN address of the EC data slice(s) into physical storage addresses.

In an example of a read operation, the user device 12 and/or 14 sends a read request to the DS processing 34, which authenticates the request. When the request is authentic, the DS processing 34 sends a read message to each of the DS storage units 36 storing slices of the data object being read. The slices are received via the DSN interface 32 and processed by the storage module 84, which performs a parity check and provides the slices to the grid module 82 when the parity check is successful. The grid module 82 decodes the slices in accordance with the error coding dispersal storage function to reconstruct the data segment. The access module 80 reconstructs the data object from the data segments and the gateway module 78 formats the data object for transmission to the user device.

Figures 4, 5:
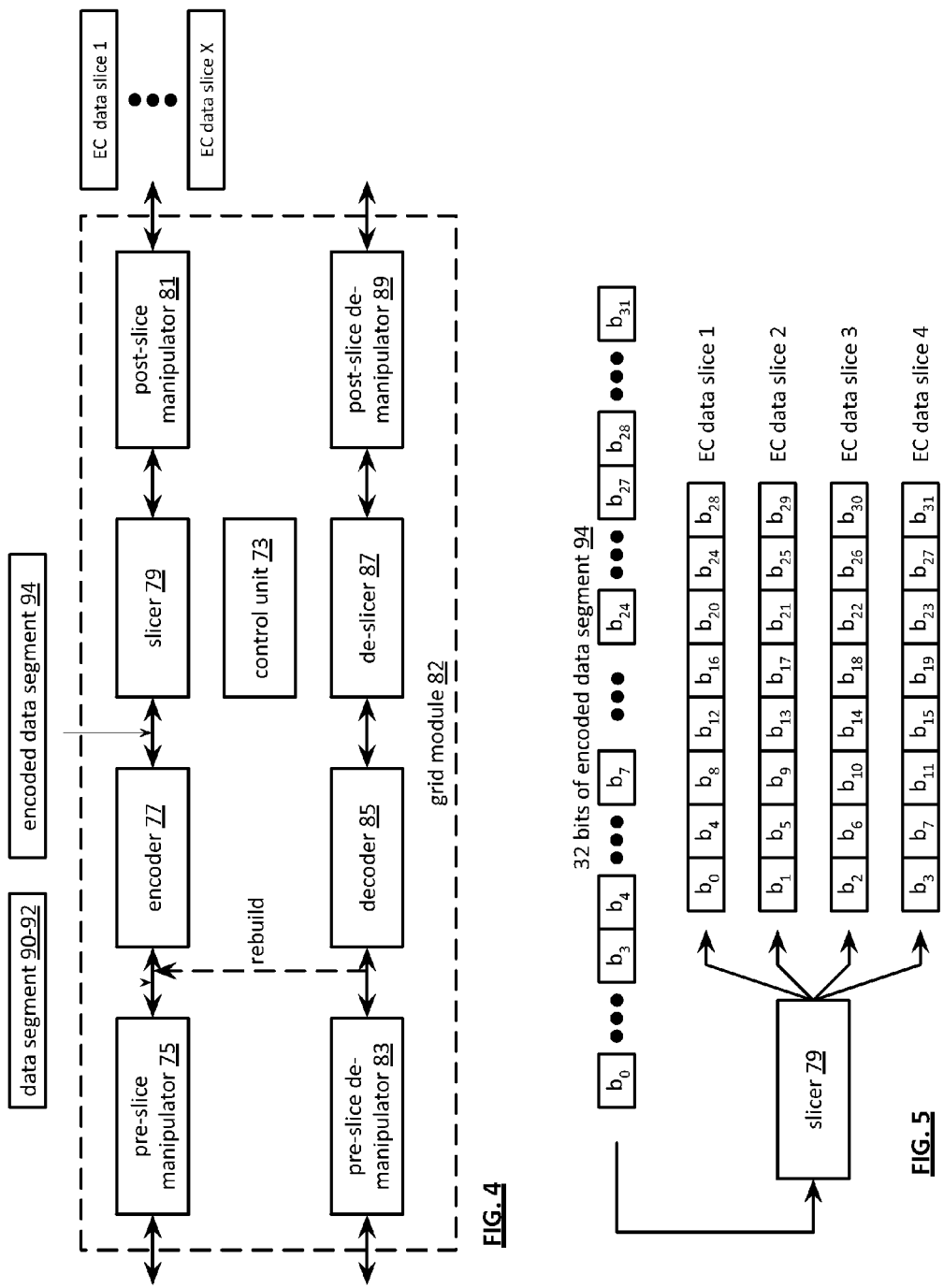
FIG. 4 is a schematic block diagram of an embodiment of a grid module in accordance with the invention.
FIG. 5 is a diagram of an example embodiment of error coded data slice creation in accordance with the invention.

FIG. 4 is a schematic block diagram of an embodiment of a grid module 82 that includes a control unit 73, a pre-slice manipulator 75, an encoder 77, a slicer 79, a post-slice manipulator 81, a pre-slice de-manipulator 83, a decoder 85, a de-slicer 87, and/or a post-slice de-manipulator 89. Note that the control unit 73 may be partially or completely external to the grid module 82. For example, the control unit 73 may be part of the computing core at a remote location, part of a user device, part of the DS managing unit 18, or distributed amongst one or more DS storage units.

In an example of write operation, the pre-slice manipulator 75 receives a data segment 42a-n and a write instruction from an authorized user device. The pre-slice manipulator 75 determines if pre-manipulation of the data segment 42a-n is required and, if so, what type. The pre-slice manipulator 75 may make the determination independently or based on instructions from the control unit 73, where the determination is based on a computing system-wide predetermination, a table lookup, vault parameters associated with the user identification, the type of data, security requirements, available DSN memory, performance requirements, and/or other metadata.

Once a positive determination is made, the pre-slice manipulator 75 manipulates the data segment 42a-n in accordance with the type of manipulation. For example, the type of manipulation may be compression (e.g., Lempel-Ziv-Welch, Huffman, Golomb, fractal, wavelet, etc.), signatures (e.g., Digital Signature Algorithm (DSA), Elliptic Curve DSA, Secure Hash Algorithm, etc.), watermarking, tagging, encryption (e.g., Data Encryption Standard, Advanced Encryption Standard, etc.), adding metadata (e.g., time/date stamping, user information, file type, etc.), cyclic redundancy check (e.g., CRC32), and/or other data manipulations to produce the pre-manipulated data segment.

The encoder 77 encodes the pre-manipulated data segment 42 using a forward error correction (FEC) encoder (and/or other type of erasure coding and/or error coding) to produce an encoded data segment 94. The encoder 77 determines which forward error correction algorithm to use based on a predetermination associated with the user's vault, a time based algorithm, user direction, DS managing unit direction, control unit direction, as a function of the data type, as a function of the data segment 42 metadata, and/or any other factor to determine algorithm type. The forward error correction algorithm may be Golay, Multidimensional parity, Reed-Solomon, Hamming, Bose Ray Chauduri Hocquenghem (BCH), Cauchy-Reed-Solomon, or any other FEC encoder. Note that the encoder 77 may use a different encoding algorithm for each data segment 42, the same encoding algorithm for the data segments 42 of a data object, or a combination thereof.

The encoded data segment 94 is of greater size than the data segment 42 by the overhead rate of the encoding algorithm by a factor of X/T, where X is the width or number of slices, and T is the read threshold. In this regard, the corresponding decoding process can accommodate at most X−T missing EC data slices and still recreate the data segment 42. For example, if X=16 and T=10, then the data segment 42 will be recoverable as long as 10 or more EC data slices per data segment are not corrupted.

The slicer 79 transforms the encoded data segment 94 into EC data slices in accordance with the slicing parameter from the vault for this user and/or data segment 42. For example, if the slicing parameter is X=16, then the slicer slices each encoded data segment 94 into 16 encoded slices.

The post-slice manipulator 81 performs, if enabled, post-manipulation on the encoded slices to produce the EC data slices. If enabled, the post-slice manipulator 81 determines the type of post-manipulation, which may be based on a computing system-wide predetermination, parameters in the vault for this user, a table lookup, the user identification, the type of data, security requirements, available DSN memory, performance requirements, control unit directed, and/or other metadata. Note that the type of post-slice manipulation may include slice level compression, signatures, encryption, CRC, addressing, watermarking, tagging, adding metadata, and/or other manipulation to improve the effectiveness of the computing system.

In an example of a read operation, the post-slice de-manipulator 89 receives at least a read threshold number of EC data slices and performs the inverse function of the post-slice manipulator 81 to produce a plurality of encoded slices. The de-slicer 87 de-slices the encoded slices to produce an encoded data segment 94. The decoder 85 performs the inverse function of the encoder 77 to recapture the data segment 42. The pre-slice de-manipulator 83 performs the inverse function of the pre-slice manipulator 75 to recapture the data segment.

FIG. 5 is a diagram of an example of slicing an encoded data segment 94 by the slicer 79. In this example, the encoded data segment includes thirty-two bits, but may include more or less bits. The slicer 79 disperses the bits of the encoded data segment 94 across the EC data slices in a pattern as shown. As such, each EC data slice does not include consecutive bits of the data segment 94 reducing the impact of consecutive bit failures on data recovery. For example, if EC data slice 2 (which includes bits 1, 5, 9, 13, 17, 25, and 29) is unavailable (e.g., lost, inaccessible, or corrupted), the data segment can be reconstructed from the other EC data slices (e.g., 1, 3 and 4 for a read threshold of 3 and a width of 4).

Figure 6:
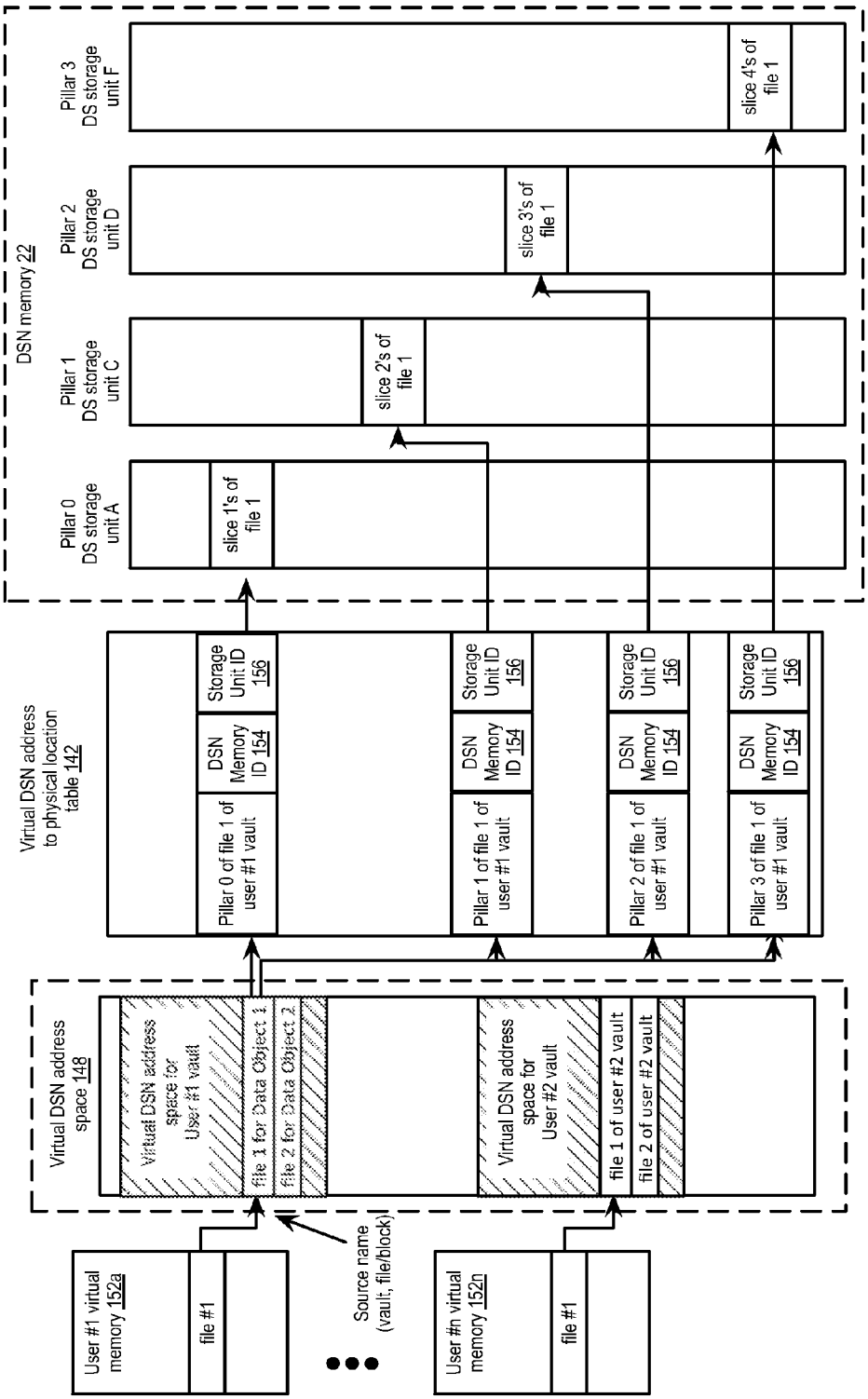
FIG. 6 is a schematic block diagram of an embodiment of a file system hierarchy in accordance with the invention.

FIG. 6 is a schematic block diagram of an embodiment of a file system hierarchy including a plurality of user virtual memories in a virtual DSN address space 148, a virtual dispersed storage network (DSN) address to physical location table 142, and a physical dispersed storage network (DSN) memory 22. The file system hierarchy is an illustration of translating a user virtual memory address space 152 into a virtual dispersed storage network (DSN) address space 148 and then to a physical address in a DSN memory 22. In this illustration, the physical DSN memory 22 includes a plurality of DS storage units 36 (e.g., A, C, D, and F). In an example, where there are four pillars, there are four slices (X=4) created for each of Y data segments. Pillars can be allocated to more than one DS storage unit, but a given DS storage unit is not generally assigned to store more than one pillar from a given file/data object of a user vault to improve system robustness (e.g., avoiding loss of multiple slices of a data segment as a result of a single DS storage unit failure).

In an embodiment, one of the plurality of user virtual memories 152a-n utilizes a native OS file system to access the virtual DSN address space 148 by including source name information in requests such as read, write, modify, delete, list, etc. A vault identifier in the source name and/or a file/block name may be used to index the virtual DSN address space 148 to determine a user vault. A unique virtual vault is associated with each user (e.g., an individual, a group of individuals, a business entity, a group of business entities, etc.) and may contain operational parameters (described with more detail with respect to FIG. 7), user attributes (e.g., user identification, billing data, etc.) and a list of DSN memories 22 and a plurality of storage units 36 for a DSN memory 22 that may be utilized to support the user.

In an example, the total virtual DSN address space 148 is defined by a forty-eight byte identifier thus creating 256⁴⁸ possible slice names. The virtual DSN address space 148 accommodates addressing of EC data slices corresponding to segments of data objects (e.g., data file, blocks, streams) over various generations and vaults. The slice name is a virtual DSN address and remains the same even as different DS memories 22 or DS storage units 36 are added or deleted from the physical DSN memory 22.

A user has a range of virtual DSN addresses assigned to their vault, user virtual memory 152a-n. For instance, the virtual DSN addresses typically do not change over the operational lifespan of the system for the user. In another instance, the virtual DSN address space 148 is dynamically altered from time to time to provide such benefits as improved security and expansion, retraction, and/or capability. A virtual DSN address space 148 security algorithm may alter the virtual DSN address space 148 according to one or more of a command (e.g., from the DS managing unit 18), a schedule, a detected security breach, or any other trigger. The virtual DSN address may also be encrypted in use thus requiring encryption and decryption steps whenever the virtual DSN address is used.

The vault and file name index used to access the virtual DSN address space 148 and to create the slice names (virtual DSN addresses) may also be used as an index to access the virtual DSN address to physical location table 142. For example, the virtual DSN address to physical location table 142 is sorted by vaults and pillars so that subsequent addresses are organized by pillar of the file data segments of a data object that have EC data slices with the same slice identifier and hence are typically stored at the same DS storage unit (e.g., slices having a first pillar identifier are stored in DS storage unit A of DSN memory 22). The output of the access to the virtual DSN address to physical location table 142 is the DSN memory identifier 154 and DS storage unit identifiers 156. A source name, data segment header and/or slice name may include the DSN memory identifier 154 and/or DS storage unit identifiers 156.

The slice names may be used as the virtual index to the memory system of each DS storage unit 36 of a particular DS memory 22 to gain access to the physical location of the EC data slices. In this instance, the DS storage unit 36 of the DS memory 22 maintains a local table correlating slice names (virtual DSN address) to the addresses of the physical media internal to the DS storage unit 36. For example, user number 1 has a vault identified operational parameter of four pillars and pillar 0 is mapped to DS storage unit A of DSN memory 22, pillar 1 is mapped to DS storage unit C of DSN memory 22, pillar 2 is mapped to DS storage unit D of DSN memory 22, and pillar 3 is mapped to DS storage unit F of DSN memory 22.

Figure 7:
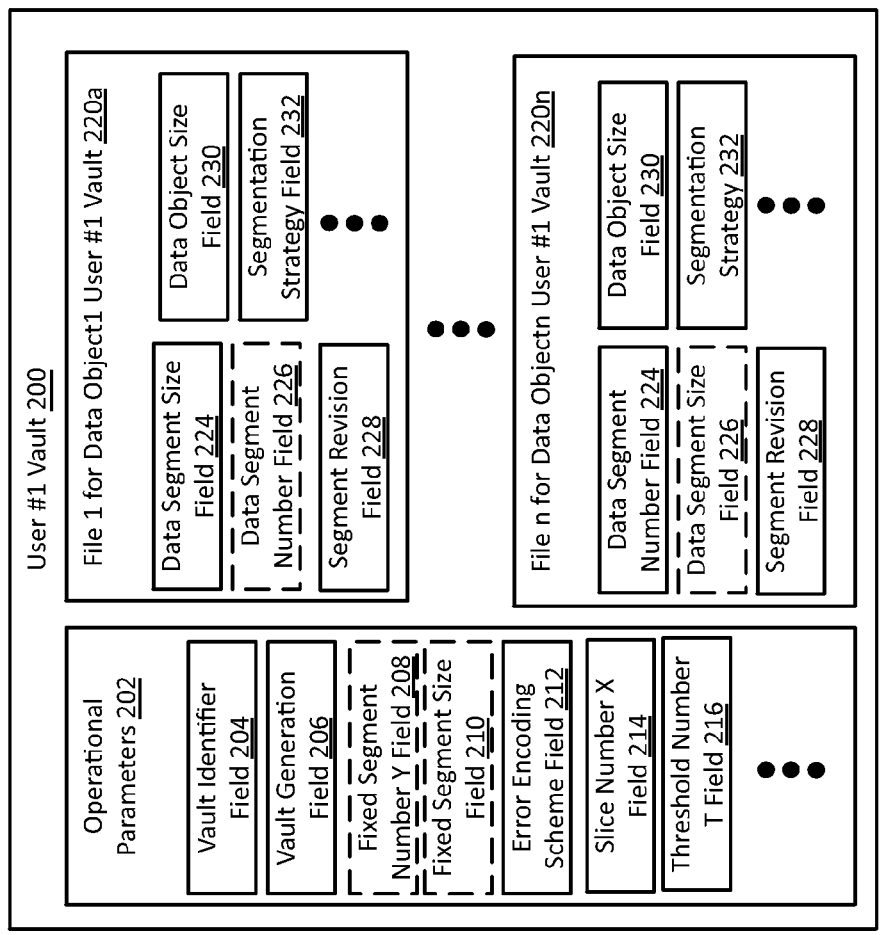
FIG. 7 is a schematic block diagram of an embodiment of a segment and slice directory in accordance with the invention.

FIG. 7 is a schematic block diagram of an embodiment of certain parameters associated with a user vault 200. The parameters illustrated in FIG. 7 may be stored in the user vault 200 or other resource, such as a user file, parameter database, file/block index, URL, etc. that is implemented in the managing unit 18, DS processing unit 16 or a DS processing module 34.

The operational parameters 202 include vault identifier field 204, vault generation field 206, error encoding scheme field 212, slice number X field 214 (e.g., number of pillars n for the user vault) and threshold number T field 216. The operational parameters 202 also include a fixed segment number Y field 208 and/or a Fixed Segment Size Field 210. In an embodiment, the user vault 200 is configured with a Fixed Segment Size Field 210. Since the data segment size is fixed, the number Y of data segments varies depending on the size of a data object. Padding or stuffing bytes may be added to one or more data segments to obtain the fixed segment size. In another embodiment, the user vault 200 is configured with a fixed segment number Y field 208. Since the number of data segments is fixed, the size of the data segments varies depending on the size of a data object. In another embodiment, a user vault 160 may have varying configurations for different data objects. For example, some data objects are partitioned into a varying number Y of data segments with a fixed segment size while other data objects are partitioned into a fixed number Y of data segments with varying size. The operational parameters 202 associated with a user vault 200 shown in FIG. 7 may also include other fields not described herein.

The user vault 200, or other resource, such as a user file, parameter database, file/block index, URL, etc., also stores Files 220a-n with data segment information specific to data objects, including data segment size field 224, data segment number Y field 226, segment revision field 228, data object size field 230 and segmentation strategy field 232. In an example for a data object 40 having 4,194,304 bytes, when the Fixed Segment Size Field 210 specifies partitioning a data object 40 into fixed byte size segments of 4,096 bytes, then the data segment number field 224 specifies 1,024 data segments for the data object. Since the segment size is fixed, the File 220 for the data object may not include the data segment size field 226. In another example for a data object 40 having 4,194,304 bytes, when the Fixed Segment Number Y Field 208 specifies Y=131,072, then the data segment size field 224 for the data object specifies 32 bytes. Since the segment number Y is fixed, the File 220 for the data object may not include the data segment number field 226. The segment revision field 228 stores a revision number for the data object. The data object size field 230 stores a size of the data object, e.g. a number of bytes in the data object. The segmentation strategy field 232 stores whether the data object has a fixed number of data segments or a fixed segment size.

In an embodiment, one or more of the parameters in the File 220 may be included in the source name 35 for a data object or included in slice names 37 for a data segment or included in a data segment name or header. Other information not shown in FIG. 7, such as data object name, source name, file id, vault id, etc. associated with a data object may be stored as well in the user vault 200.

In an embodiment, when a stored data object needs to be modified, a user device 12 and/or 14 sends a modification request to a DS processing module 34, which authenticates the request. When the request is authenticated, the DS processing 34 reconstructs each of the plurality of data segments for the data object. It sends a read message to each of the DS storage units 36 storing at least a threshold number T of data slices for each of the plurality of data segments. The data slices are received for the plurality of data segments and the data segments are rebuilt therefrom. The DS processing 34 then reconstructs the data object from the plurality of rebuilt data segments and modifies the data object as per the modification request. However, this process of modification requires that each of the plurality of data segments is rebuilt and that in turn requires retrieving data slices for each data segment.

Figure 8:
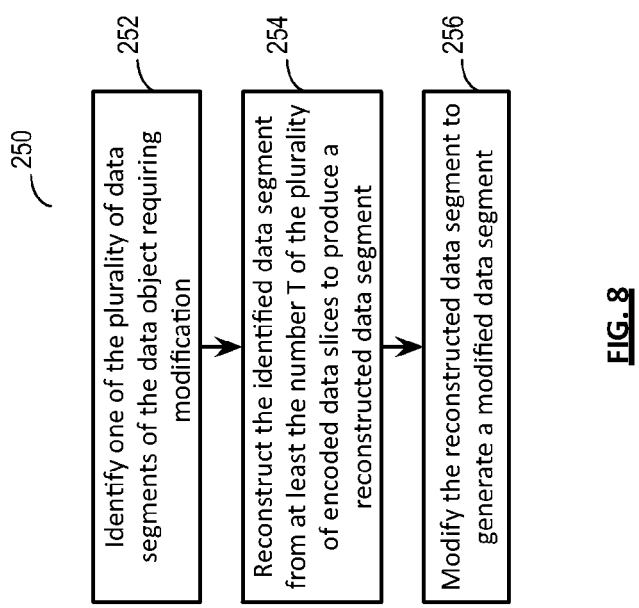
FIG. 8 is a logic flow diagram of an embodiment of a method for modifying a data object in accordance with the invention.

FIG. 8 is a flowchart illustrating another embodiment of a method 250 for modifying a stored data object 40 in the distributed storage network in accordance with the invention. In this embodiment, the DS processing module 34 only retrieves the data segments of the data object that require modification in response to the modification request. This embodiment improves response time and security by retrieving and rebuilding only a portion of the data object rather than the entire data object. In addition, only the rebuilt portion of the data object needs to be processed and stored after modification.

In operation, the DS processing module 34 identifies at least one of a plurality of data segments of a data object requiring modification in step 252. The DS processing module 34 reconstructs the identified data segment from at least a threshold number T of the plurality of encoded data slices for the identified data segment to produce a reconstructed data segment in step 254. The DS processing module 34 then modifies the reconstructed data segment to generate a modified data segment in step 256. The modifications may include additions, deletions or revisions to one or more bytes of the reconstructed data segment. In an embodiment, the DS processing module 34 then generates a plurality of rebuilt encoded data slices from the modified data segment using the error encoding dispersal function and transmits the rebuilt encoded data slices for storage.

Figure 9:
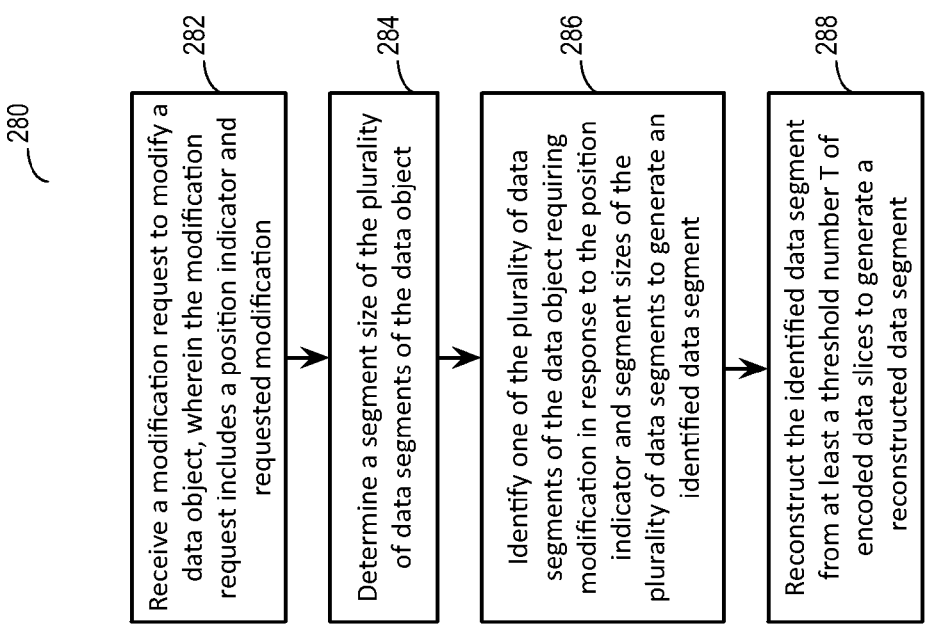
FIG. 9 is a logic flow diagram of an embodiment of a method for identifying a data segment of a data object for modification in accordance with the invention.

FIG. 9 is a logic flow diagram of an embodiment of a method 280 for identifying at least one of a plurality of data segments of a data object requiring modification. In an embodiment, in step 282, the DS processing module 34 receives a request to modify a portion of a data object 40 from one of a user device 12-14, DS processing unit 16, DS managing unit 18, storage integrity processing unit 20, DSN memory or a DS unit 36. In an embodiment, the modification request includes, inter alia, a user ID field, object name field and a position indicator and requested modifications. The position indicator includes an identification of or pointer to one or more bytes of the data object 40 for modification. For example, the position indicator may indicate byte 125,348 out of 2,465,820 bytes in the data object 40.

The DS processing module 34 determines a segment size of the plurality of data segments of the data object in step 284. In an embodiment, the DS processing module 34 accesses the user vault 200 to determine a data segment size for the data object 40. When the operational parameters 202 for a user vault 200 indicate that data segments must have a fixed size, then the DS processing module 30 may only need to access the Fixed Segment Size Field 210 for the user vault 200. When the user vault indicates data objects have a fixed segment number Y with varying sizes, then the DS Processing Module 34 may also need to access the data segment size field 224 for the data object in one of the Files 220a-n. In an embodiment, the data segments of a data object may have varying sizes. For example, a first data segment includes 100,000 bytes and a second data segment includes 80,000 bytes, etc. In such a case, the DS processing module 34 must determine one or more sizes for the plurality of the data segments of the data object from the user vault 200. In another embodiment, the modification request may include a data segment size for the plurality of data segments for the data object.

The DS processing module 34 in step 286 then identifies one or more data segments of the data object 40 requiring modification based on the position indicator and the data segment sizes. For example, when the data segment size is 100,000 bytes and the position indicator denotes byte 125,348, the DS processing module 34 identifies the second data segment of the data object 40 for modification because it includes the byte 125,348 that requires modification. Once the data segment is identified, the DS processing module 34 then determines a virtual DSN address of the encoded data slices for the identified data segment from the user virtual memory 152, source name, data segment header, etc. and retrieves at least a threshold number T of the encoded data slices for the identified data segment from a DSN memory 22 based on the virtual DSN address to physical location table 142. The DS processing module then reconstructs the identified data segment to generate a reconstructed data segment in step 288.

Figure 10:
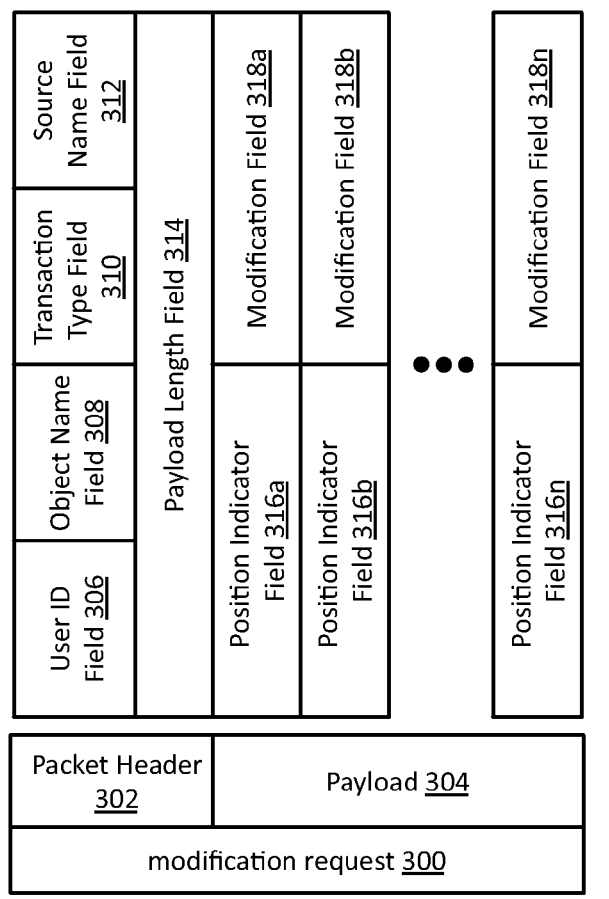
FIG. 10 is a schematic block diagram of an embodiment of a modification request in accordance with the invention.

FIG. 10 is a schematic block diagram of an embodiment of a modification request 300. The modification request 300 includes a packet header 302 having for example, a user ID field 306, object name field 308, transaction type field 310, source name field 310 and payload length field 314. The transaction type field 310 identifies the packet as a modification request. In operation, the DS processing module 34 processes the source name field 312 information in the modification request 300 to determine a vault identifier and to index the user vault 200. When a source name is not available, the DS processing module 34 utilizes the user ID and object name to access the user virtual memory 152 to determine a vault identifier. The DS processing module then determines a virtual DSN address 148 for the data object from user virtual memory 152.

The payload 304 of the modification request 300 includes one or more position indicator fields 316a-n and corresponding one or more modification fields 318a-n. The position indicator field 316 includes an identification of or pointer to one or more bytes of the data object 40 for modification in accordance with the corresponding modification field 318. The modification field 318 may include instructions for additions, deletions or revisions.

FIG. 11 is a logic flow diagram of an embodiment of a method 340 for modifying the reconstructed data segment. In step 342, the DS processing module 34 modifies the reconstructed data segment in accordance with the modification request to generate a modified data segment. The modification may include changing one or more bytes of the data segment or deleting or adding one or more bytes. In an embodiment, the DS processing module 34 identifies and modifies more than one data segment when one or more bytes to be modified are included within more than one data segment. In step 344, the data segment size field 224 in the user vault 200 or in a source name or packet header for the data segment is modified to update any changes to the data segment size. The segment revision field 228 in the user vault 200 or in a source name or packet header for the data segment is also updated in step 346.

FIG. 12 is a logic flow diagram of another embodiment of a method 350 for modifying the reconstructed data segment. When modifications result in deleting or adding one or more bytes to a data segment or otherwise changing the data segment size in step 352, the DS processing module 34 in step 354 determines whether the modified data segment size needs to be revised in step 354. For example, the operational parameters 202 for the user vault 200 may require a fixed segment size or each of the plurality of data segments for the data object may each need to have a same data segment size, etc. When the segment size of the modified data segment does not need to be modified, the process continues to step 364 in which a data segment size field 224 is updated and then to step 366 in which a revision field is updated.

When the modified data segment size needs to be revised in step 354, the DS processing module 34 determines whether it needs to increase or decrease the size of the modified data segment in step 356. To increase the size of the modified data segment in step 358, the DS processing module includes stuffing or padding bytes to the data segment. When the modified data segment size needs to decrease, the DS processing module 34 divides the modified data segment to generate at least two divided modified data segments in step 360. The DS processing module 34 may then add stuffing or padding bytes to one or more of the divided data segments to reach the desired segment size, e.g., the fixed segment size or data segment size of the other plurality of data segments for the data object, etc. In step 362, the DS processing module updates the Data Segment Number Y field 226 for the data object 40 in the user vault 200. The DS processing module 30 also updates the data segment size field 224 in step 364, and the revision field 228 for the data segment is updated to indicate a new number of total data object bytes in step 366.

When modification is complete on a modified data segment (including any divided modified data segments), the DS processing module 34 encodes the modified data segment and slices it using an error encoding dispersal function based on the operational parameters in the user vault 200 to produce a number X of rebuilt encoded data slices. The DS processing module 34 generates a write request message to transmit the rebuilt encoded data slices to a DSN memory 22 for storage in a plurality of DS units 36.

Figure 13:
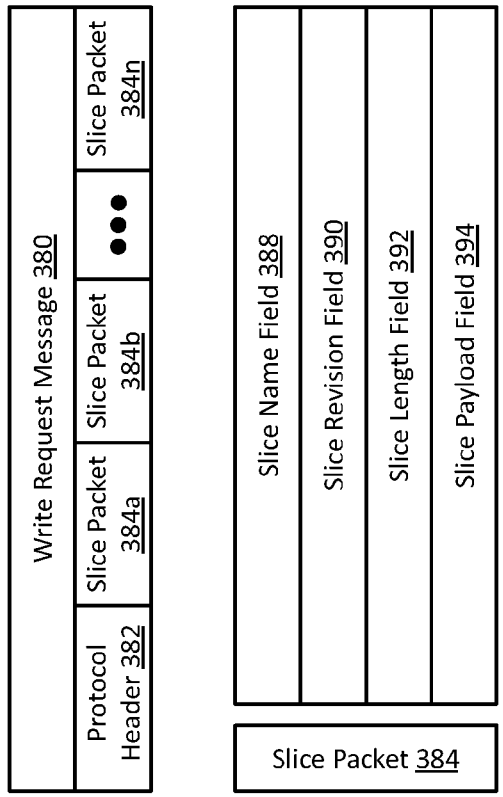
FIG. 13 is a schematic block diagram of an embodiment of a write request in accordance with the invention.

FIG. 13 illustrates a schematic block diagram of an embodiment of a write request message 380 having a protocol header 382 and a payload with one or more slice packets 384a-n. A slice packet 384 includes a slice name field 388, a slice revision field 390, a slice length field 392, and a slice payload field 394. Each of the fields of a slice packet corresponds to the same encoded data slice. The slice name field 388 contains the slice name of the rebuilt encoded data slice while the slice revision field 390 contains a slice revision of the rebuilt encoded data slice. Since the rebuilt encoded data slice has been modified, the slice revision field is updated to reflect a new version. The slice length field 392 includes a slice length value representing a number of bytes of the rebuilt encoded data slice. The slice payload field 394 includes the bytes of the rebuilt encoded data slice.

Figure 14:
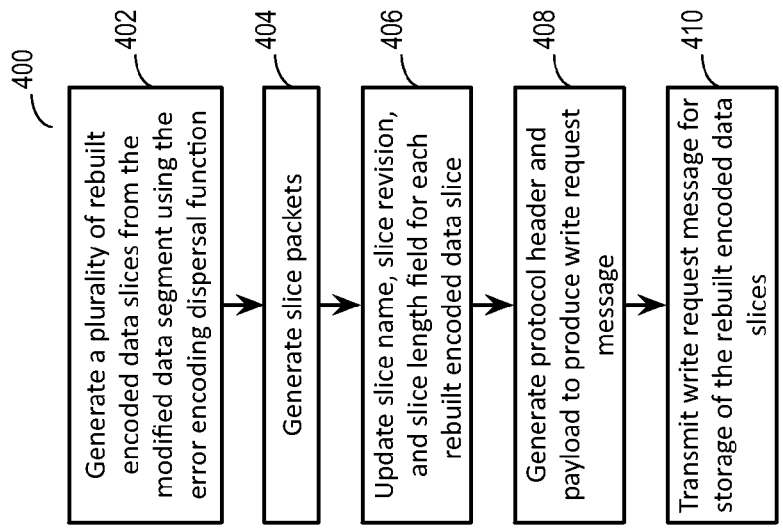
FIG. 14 is a logic flow diagram of an embodiment of a method for generating and storing rebuilt encoded data slices from a modified data segment in accordance with the invention.

FIG. 14 illustrates a logic flow diagram of an embodiment of a method 400 for generating and storing rebuilt encoded data slices from a modified data segment. As discussed, the DS processing module 34 encodes the modified data segment and slices it using an error encoding dispersal function based on the operational parameters in the user vault 200 to produce a plurality of rebuilt encoded data slices in step 402. The DS processing module 34 generates a slice packet 384 for each of the plurality of rebuilt encoded data slices in step 404 and updates the slice name field 388, slice revision field 390, slice length field 392 and slice payload field 394 for each of the slice packets 384 in step 406. The DS processing module 34 generates the protocol header and payload with the slice packets 384 to produce a write request message in step 408 and transmits the write request message to one or more DSN memories 22 for storage of the rebuilt encoded data slices in a plurality of storage units 36 in step 410. The DS processing module 34 may update the virtual DSN address to physical location table 142 when there are any changes to the addressing of the rebuilt encoded data slices.

Figure 15:
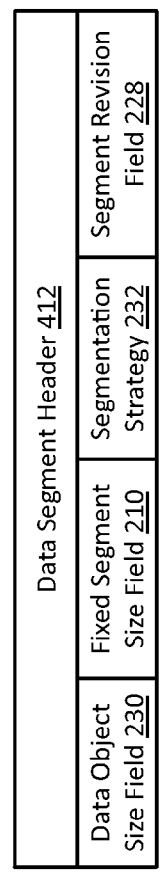
FIG. 15 is a schematic block diagram of an embodiment of a data segment header in accordance with the invention.

FIG. 15 is a schematic block diagram of an embodiment of a data segment header 412 for a data segment 42. The data segment 412 includes a data object size field 230, a fixed segment size field 210, segmentation strategy field 232 and segment revision field 228. The data segment header 412 may be included with a first of the plurality of data segments of the data object or included on each of the data segments. Additional or alternate fields may also be included in the data segment header 412.

Figure 16:
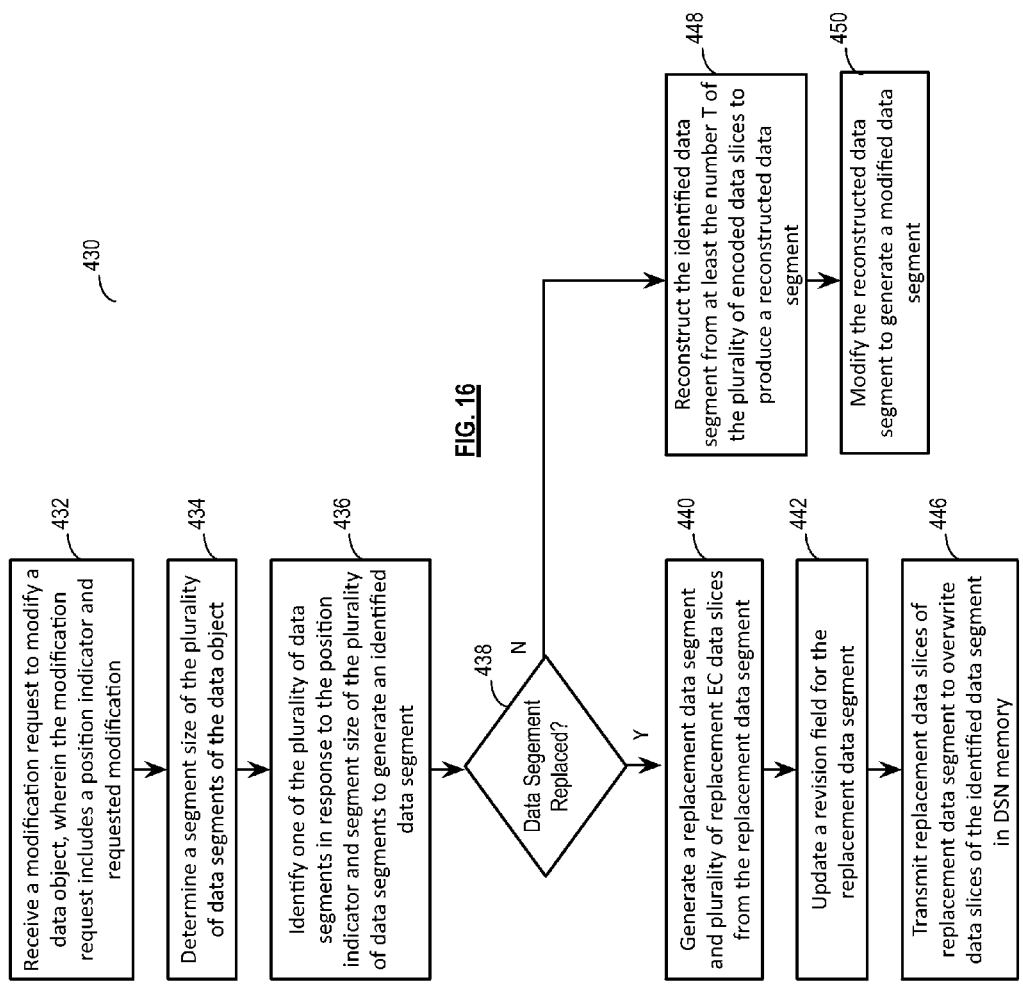
FIG. 16 is a logic flow diagram of another embodiment of a method for modifying a data object in accordance with the invention.

FIG. 16 is a flowchart illustrating another embodiment of a method 430 for modifying a data object stored in a DSN memory 22. In an embodiment, the DS processing module 34 replaces an identified data segment without reconstructing it. For example, when a modification request includes modifications that would replace data for an entire identified data segment, then the identified data segment does not need to be reconstructed. Instead, a replacement data segment is generated and the identified data segment is replaced or overwritten by the replacement data segment.

In an embodiment, in step 432, the DS processing module 34 receives a modification request 300 to modify a data object 40 from one of a user device 12-14, DS processing unit 16, DS managing unit 18, storage integrity processing unit 20, DSN memory or a DS unit 36. The DS processing module 34 determines a segment size of the plurality of data segments of the data object in step 434. The DS processing module 34 in step 436 then identifies one or more data segments of the data object 40 requiring modification based on the position indicator and the data segment size of the plurality of data segments to generate an identified data segment. In step 438, the DS processing module 34 determines whether the identified data segment is replaced. For example, the requested modifications may include new data or revised data for the entire identified data segment. If so, a replacement data segment is generated from the data in the modification request in step 440. The replacement data segment is then processed based on an error encoding dispersal function to generate a plurality of replacement data slices in step 440. A segment revision 228 is updated for the replacement data segment in the user vault 200 or the data segment header 412. The slice revision field 390 for the plurality of replacement data slices is also revised in step 442 though the replacement data slices will retain the same slice names as the stored data slices of the identified data segment. The DS processing module 34 then transmits the plurality of replacement data slices to the DSN memory 22 in step 446. The plurality of data slices from the identified data segment are deleted and overwritten or replaced by the plurality of replacement data slices of the replacement data segment.

When a data segment is not replaced in step 438, the identified data segment is reconstructed in step 448 and modified to generate a modified data segment in step 450 as described herein.

In an embodiment, the DS processing module 34 identifies and reconstructs one or more data segments of a data object that require modification in response to a modification request. Response time and security are improved because only a portion of the data object is processed for modification.

FIG. 17 is a logic flow diagram of an embodiment of a method 500 for updating software operating or stored on system elements of the distributed storage network. The system elements include devices or modules thereof operating in the distributed storage network, such as inter alia, user device 12, 14, DS processing unit 16, computing core 26, interfaces 30, 32, 38, DS managing unit 18, storage integrity unit 20, DSN memory 22, and DS unit 36. DS managing unit 18 determines whether a software update for one or more of the system elements is available in step 502. A software update includes updates, fixes, patches, new applications, new versions of existing applications, or other modifications or additions to the software operating or stored on a system element. For example, the DS managing unit 18 determines whether a software update has been received over a network connection from another network node or a memory device (e.g., a disc, a USB memory stick, etc.) or whether a software update is available for download, such as from a network web server or other resource.

When available in step 504, the DS managing unit 18 downloads or receives the software update and stores the software update in a repository memory. When the DS managing unit 18 determines that software updates are not currently available in step 504, the DS managing unit 18 continues to determine whether a software update for one or more of the system elements is available.

In step 506, the DS managing unit 18 determines whether any of the system elements require the software update. For example, the DS managing unit 18 may maintain a list of system elements and versions of software operating thereon.

The DS managing unit 18 then compares the version of the software update to the version listed for the system elements. In another example, the DS managing unit 18 may determine whether the software update is optional, recommended or required. For example, the system elements may have a current version, not utilizing the applicable software, etc. When the DS managing unit 18 determines that the system elements do not currently require the software update in step 508, the process continues back to step 502.

When the DS managing unit 18 determines that the system elements do not currently require the software update in step 508, the DS managing unit identifies a system element to update in step 510 based on one or more factors. For example, the DS managing unit 18 may determine to install the software update first when it requires the update. In another example, a factor includes maintaining availability of at least a threshold number T of a storage set of DS units 36. A storage set is the plurality of DS units 36 that store pillars for a user vault. Since the update process make take minutes or even hours, a limit on the number of DS units 36 that are unavailable due to a software update process may still enable a data object to be retrieved that is stored in the storage set. For example, at least a threshold number T of DS units 36 in a storage set need to be available to retrieve a data object. In another example, the DS managing unit 18 determines that at least a threshold number T plus a safety factor (e.g., one or two) of DS units 36 are available to enable the retrieval of data objects. In other words, the DS managing unit 18 will only update a number of DS units in the same storage set equal to [width n number of pillars−read threshold number T−safety factor]. For example, the DS managing unit 18 may concurrently update 4 DS units when n=16, read threshold T=10, and the safety factor=2.

The DS managing unit sends an activate process update client (PUC) message to the identified system element to initiate the software update process for that system element in step 512. If additional system elements require the software update, the process continues to step 510 to identify a next system element to update.

FIG. 18 is a logic flow diagram of an embodiment of a method 520 for updating software operating or stored on a system element of the distributed storage network. In an embodiment, a system element installs a software update. The system element may have previously installed a process update client program which may be utilized to install and activate the software update. In step 522, the system element determines whether it has received an activate process update client (PUC) message where the determination is based on comparing incoming commands from the network to that of the PUC command. When the system element determines that it has not received an activate process update client (PUC) message in step 524, the process continues to step 522 to continue to scan for a PUC command. When the system element has received a PUC command, the system element activates the PUC and changes its status to unavailable in step 526. The system element may complete critical steps in progress prior to changing the status and stop accepting new tasks.

The system element may suspend active processes in step 528 and save next steps in such suspended processes to execute later. The system element determines a location of the software update based on a local registry that may contain the network uniform resource identifier (URI) of the software repository and/or the URI of the DS managing unit 18 or other location. The system element accesses the URI and downloads the software update in step 530. The system element installs the software update in step 532. The software update should be backwards compatible with previous software versions to enable interactions with other system elements that have not installed the software update. The system element may activate one or more software installation and activation scripts included with the software update to perform an initialization in step 534. When complete, the system element changes its status from unavailable to available, and it may complete earlier suspended tasks.

As may be used herein, the term(s) "coupled to" and/or "coupling" and/or includes direct coupling between items and/or indirect coupling between items via an intervening item (e.g., an item includes, but is not limited to, a component, an element, a circuit, and/or a module). As may further be used herein, inferred coupling (i.e., where one element is coupled to another element by inference) includes direct and indirect coupling between two items in the same manner as "coupled to". As may even further be used herein, the term "operable to" indicates that an item includes one or more of power connections, input(s), output(s), etc., to perform one or more its corresponding functions and may further include inferred coupling to one or more other items. As may still further be used herein, the term "associated with", includes direct and/or indirect coupling of separate items and/or one item being embedded within another item.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

What is claimed is:
1. A method for modifying a data object in a distributed storage network, comprises:
  receiving a modification request to modify the data object, wherein the modification request includes requested modifications to the data object and a position indicator that indicates a portion of the data object for modification;
  identifying one of a plurality of data segments of the data object including the portion of the data object for modification to produce an identified data segment, wherein the identified data segment is stored as a plurality of encoded data slices that are generated from the identified data segment based on an error encoding dispersal function;

reconstructing the identified data segment from at least a number T of the plurality of encoded data slices to produce a reconstructed data segment, wherein the number T corresponds to a number of the plurality of encoded data slices needed to reconstruct the identified data segment based on the error encoding dispersal function; and modifying the reconstructed data segment in response to the requested modifications in the modification request to generate a modified data segment.

2. The method of claim 1, wherein the position indicator in the modification request indicates one or more bytes of the data object for modification and wherein identifying one of the plurality of data segments comprises:

determining a size of the plurality of data segments of the data object from a segment size field; and identifying one of the plurality of data segments requiring modification in response to the position indicator and the size of the plurality of data segments of the data object.

3. The method of claim 1, further comprising:

generating a plurality of rebuilt encoded data slices from the modified data segment using the error encoding dispersal function;

transmitting the plurality of rebuilt encoded data slices for storage in a plurality of storage units; and modifying a revision field for the plurality of rebuilt encoded data slices.

4. A distributed storage processing module in a distributed storage network, comprises:

a network interface for interfacing with a plurality of storage units in the dispersed storage network; and a processing module operably coupled to:

receive a modification request to modify a data object, wherein the data object is stored as a plurality of data segments;

identify one of the plurality of data segments requiring modification in response to the modification request to produce an identified data segment, wherein the identified data segment is stored as a plurality of encoded data slices in the plurality of storage units;

retrieve at least a number T of the plurality of encoded data slices from the plurality of storage units, wherein the number T corresponds to a number of the plurality of encoded data slices needed to reconstruct the identified data segment based on an error encoding dispersal function;

reconstruct the identified data segment from at least the number T of the plurality of encoded data slices to produce a reconstructed data segment;

modify the reconstructed data segment in accordance with the modification request to generate a modified data segment; and generate a plurality of rebuilt encoded data slices from the modified data segment using the error encoding dispersal function and transmit the plurality of rebuilt encoded data slices for storage in the plurality of storage units.

5. The distributed storage processing module of claim 4, wherein the modification request includes requested modifications to the data object and a position indicator that points to one or more bytes of the data object for modification.

6. The distributed storage processing module of claim 5, wherein the processing module is operably coupled to identify one of the plurality of data segments requiring modification in response to the position indicator and size of the plurality of data segments of the data object.

7. The distributed storage processing module of claim 6, wherein the processing module is operably coupled to determine the size of the plurality of data segments of the data object from a segment size field stored in a user vault in a segment and slice directory.

8. The distributed storage processing module of claim 7, wherein the modification request further includes a user identification and object name.

9. The distributed storage processing module of claim 8, wherein the processing module is further operably coupled to:

determine a source name for the data object from the user name and object name, wherein the source name is associated with each of the plurality of data segments of the data object; and determine a slice name for each of the number T of plurality of encoded data slices of the identified data segment from source name and the segment and slice directory.

10. The distributed storage processing module of claim 9, wherein the processing module is further operably coupled to:

determine a location of the number T of plurality of encoded data slices from the slice name and a virtual DSN address to physical location table.

11. The distributed storage processing module of claim 10, wherein the processing module is further operably coupled to:

modify a slice revision field for the rebuilt encoded data slices.

12. The distributed storage processing module of claim 11, wherein the processing module is further operably coupled to:

update the segment size field in the user vault in the segment and slice directory when the size of the modified data segment varies from the identified data segment; and update a segment revision field for the modified data segment to indicate a revised number of data object bytes.

13. A method for modifying a data object in a distributed storage network, comprises:

receiving a modification request to modify the data object, wherein the data object is stored as a plurality of data segments;

identifying one of the plurality of data segments requiring modification in response to the modification request to produce an identified data segment, wherein the identified data segment is stored as a plurality of encoded data slices that are generated from the identified data segment based on an error encoding dispersal function;

reconstructing the identified data segment from at least a number T of the plurality of encoded data slices to produce a reconstructed data segment, wherein the number T corresponds to a number of the plurality of encoded data slices needed to reconstruct the identified data segment based on the error encoding dispersal function; and modifying the reconstructed data segment in accordance with the modification request to generate a modified data segment.

14. The method of claim 13, wherein the modification request includes requested modifications to the data object and a position indicator that points to one or more bytes of the data object for modification.

15. The method of claim 14, further comprising:

determining a size of the plurality of data segments of the data object from a segment size field stored in a user vault in a segment and slice directory; and identifying one of the plurality of data segments requiring modification in response to the position indicator and the size of the plurality of data segments of the data object.

16. The method of claim 15, further comprising:

updating the segment size field in the user vault in the segment and slice directory when the size of the modified data segment varies from the identified data segment; and updating a segment revision field of the modified data segment to indicate a revised number of data object bytes.

17. The method of claim 13, further comprising:

generating a plurality of rebuilt encoded data slices from the modified data segment using the error encoding dispersal function; and transmitting the plurality of rebuilt encoded data slices for storage in a plurality of storage units.

18. The method of claim 17, further comprising:

modifying a slice field for the plurality of rebuilt encoded data slices.

19. The method of claim 13, wherein modifying the reconstructed data segment comprises:

revising the reconstructed data segment in accordance with the modification request to generate the modified data segment, wherein a number of bytes of the modified data segment exceeds a fixed segment size; and generating at least two data segments from the modified data segment to generate a plurality of divided data segments, wherein each of the plurality of divided data segments have the fixed segment size.

20. A method for modifying a data object in a distributed storage network, comprises:

identifying one of a plurality of data segments of the data object requiring modification in response to a modification request of the data object to produce an identified data segment, wherein the identified data segment is stored as a plurality of encoded data slices in a DSN memory;

determining to replace the identified data segment;

generating a replacement data segment based on one or more modifications in the modification request;

generating a plurality of replacement encoded data slices from the replacement data segment based on an error encoding dispersal function; and transmitting the plurality of replacement encoded data slices to replace the plurality of encoded data slices of the identified data segment in the DSN memory.

* * * * *